United States Patent [19]

Lange et al.

[11] 4,363,108

[45] Dec. 7, 1982

[54] LOW COST PROGRAMMABLE VIDEO COMPUTER TERMINAL

[75] Inventors: Ronald E. Lange; Steve E. King, both of Phoenix, Ariz.

[73] Assignee: Honeywell Information Systems Inc., Phoenix, Ariz.

[21] Appl. No.: 51,590

[22] Filed: Jun. 25, 1979

[51] Int. Cl.³ .............................................. G06F 3/153

[52] U.S. Cl. ...................................................... 364/900

[58] Field of Search ... 364/200 MS File, 900 MS File, 364/521, 522; 340/747, 748, 750, 798, 799, 709; 358/903

[56] References Cited

U.S. PATENT DOCUMENTS

| | | | |
|---|---|---|---|
| 3,921,166 | 11/1975 | Volpe | 340/748 X |
| 3,973,244 | 8/1976 | Lovercheck et al. | 364/200 |
| 4,026,555 | 5/1977 | Kirschner et al. | 358/903 X |
| 4,028,695 | 6/1977 | Saich | 340/709 X |
| 4,064,490 | 12/1977 | Nagel | 364/900 |
| 4,149,264 | 4/1979 | Hamada et al. | 364/900 |
| 4,161,728 | 7/1979 | Insam | 358/903 X |

*Primary Examiner*—Gareth D. Shaw
*Assistant Examiner*—Thomas M. Heckler
*Attorney, Agent, or Firm*—Lockwood D. Burton; William W. Holloway, Jr.; L. J. Marhoefer

[57] ABSTRACT

There is disclosed herein an apparatus for displaying data and communicating with another data processing device via a parallel port or over a long distance communications network via a full duplex modem, said computer terminal utilizing a microprocessor for programmed control of the terminal. The terminal is capable of displaying information on a standard black and white television set and utilizes a keyboard for entering information to be displayed or sent to the main data processing system. Limited graphics with sixty four graphics patterns are also available by using the microprocessor chip to scan the keyboard and communicate with the modem and parallel ports, and by utilizing a standard television set instead of a cathode ray tube, substantial material cost savings can be made in building the terminal which could be built for under $250 in parts in 1979.

2 Claims, 16 Drawing Figures

LOW COST PROGRAMMABLE VIDEO COMPUTER TERMINAL

BACKGROUND OF THE INVENTION

The application discloses subject matter related to that disclosed and claimed in the patent application Ser. No. 51,473, filed June 25, 1979 entitled "Microprocessor Based Computer Terminal" and patent application Ser. No. 51,783, filed June 25, 1979 entitled "Low Cost Digital Data Display Apparatus".

The invention relates generally to the field of digital computer peripherals and more particularly to the field of programmable computer terminals. Prior art terminals utilized expensive cathode ray tubes and special interface chips such as USARTS to accomplish the task of communicating with and displaying information from the main computer. The cheapest terminals available in 1979 were around 500 dollars and not as powerful or flexible as the disclosed terminal.

The hardware disclosed herein is capable of reading and writing on a serial communication line at adjustable speeds up to 600 baud utilizing a modem. It can read a keyboard and read and write from a parallel port. All entering data from any input may be displayed on a black and white television set and all data being displayed may simultaneously be transmitted out the serial or parallel ports. Upper and lower case and page and scroll mode are available and any combination of inputs and outputs can be set from the keyboard. Field reversal is also available. Carriage return, line feed, clear screen, home up and cursor positioning are also available. Finally, a limited graphics capability exists by virtue of a PROM that may be programmed with any graphics patterns desired by an individual user.

The numerous functions and flexibility provided in the disclosed apparatus is due to use of a programmed microprocessor. The low cost is attributed primarily to use of a standard home television set in conjunction with a microprocessor programmed to perform many of the functions formerly performed by separate chips.

The prior art is crowded with computer terminal apparatus. However, the least expensive computer terminal available at the time of filing sold for more than twice as much as the disclosed computer terminal could be built for in kit form. Further, no terminal in the prior art had as many options and capabilities and yet had as low a cost as the disclosed terminal.

SUMMARY OF THE INVENTION

Broadly speaking, the disclosed apparatus consists of a combination of several distinct subcombinations. Each of these subcombinations which may be separately manufactured and used alone or in combination with the other subcombinations or in combination with other apparatus which performs the same or similar functions as the subcombinations disclosed herein.

The preferred embodiment described here can be generally divided into two subcombinations. The first is a means for storing data to be displayed and for displayig it on a standard home television set. The second subcombination is a means for sending data to and receiving data from another data processing device and for storing the data being sent or received in the first subcombination for display. The second subcombination also controls the display by the first.

The second subcombination is comprised of a keyboard for entry of data and control signals by a human operator, a parallel port and/or modem, and a microprocessor. Data from the keyboard may be displayed and/or transmitted out from the parallel port and/or the modem.

The parallel port serves to interface between the computer terminal and another data processing device so that data may be sent to and received from the other data processing device in parallel format.

The modem serves to interface between the terminal and another data processing device at a distance from the terminal via the telephone lines or some other communications network. The modem converts binary data from the computer terminal into signals suitable for transmission over the communications network. It also converts signals received from the other data processing device over the communications network into binary data for use by the terminal in display and/or simultaneous transmission out from the parallel port.

The microprocessor is coupled to the keyboard, the modem, the parallel port and the first subcombination by a data bus, an address bus, or one or more control input and output signals or some combination of the above depending upon the requirements of the device. The microprocessor serves to control the input/output communications functions of computer terminal and, in the preferred embodiment, to supply vertical synchronization and banking signals, Vert Sync and Blank, to the first subcombination for use by it in the display function. Input/output is performed by the microprocessor by periodic scanning of the keyboard and the port to test for incoming data or, in the case of the keyboard, incoming control signals indicating which options are selected and what processing of the data is desired. Incoming data to the modem is sensed by the microprocessor when a start bit is received comprised of the first transition from a constant stream of logical ones to the first logical zero. The control signals from the keyboard cause the microprocessor to control whether the display by the first subcombination is in the alphanumeric or is in graphics mode and whether it is white on a black field or is black on a white field. The microprocessor also controls whether the display is in the page mode or is in the scroll mode by supplying to the first subcombination the vertical address of the first line to be displayed. Finally, the microprocessor supplies the data to be dislayed to the first subcombination and controls whether this data is simultaneously transmitted out from the modem or out from the parallel port or out from both.

The second subcombination could be used alone without the first if the dislay function is not desired.

The first subcombination is comprised of a means for producing a composite video signal. This composite video signal is supplied to standard home television sets.

The first element of this first subcombination is a horizontal address counter which serves to supply a horizontal address of the character being displayed. It also serves to generate the horizontal synchronization and blanking data.

A vertical address counter, which in the preferred embodiment can be preset to a given address by the microprocessor, counts the horizontal lines that have been traced by the T.V. in order to generate a vertical address for the character and the line of dots within the dot matrix representing the character being displayed. The vertical address counter could be modified in other embodiments to supply vertical sync and blanking signals.

Each character or graphics pattern capable of being displayed by the terminal is represented by a dot matrix nine dots wide by sixteen lines tall. These preprogrammed dot matrices are stored in a character generator ROM and a limited graphics PROM.

A RAM receives the data to be displayed from the microprocessor in a write mode and, in a read mode, supplies a character data byte to the character data inputs of the character generator ROM and limited graphics PROM. The portion of the vertical address following the first three bits used by the ROM or PROM to determine which matrix is to be displayed. The first three bits of the vertical address designate which line of the matrix is to be presented at its output as the dot line byte.

This dot line byte is received either by the character or graphics shift register and shifted out serially as the video information. A gate array combines this video information with the horizontal and vertical sync and blanking information to form the composite video signal.

The RAM receives the address in which to store the character data received from the microprocessor from the address bus. In the read mode, the address from which to fetch the character data to be displayed is supplied by the vertical and horizontal address counters. Switching of address to the RAM address input is done by a two line to one multiplexer under the control of the microprocessor. In other embodiments, control of the multiplexer could be manual or automatically supplied from some apparatus.

DETAILED DESCRIPTION OF THE PREFERRED EMBODIMENT

Figure 1:
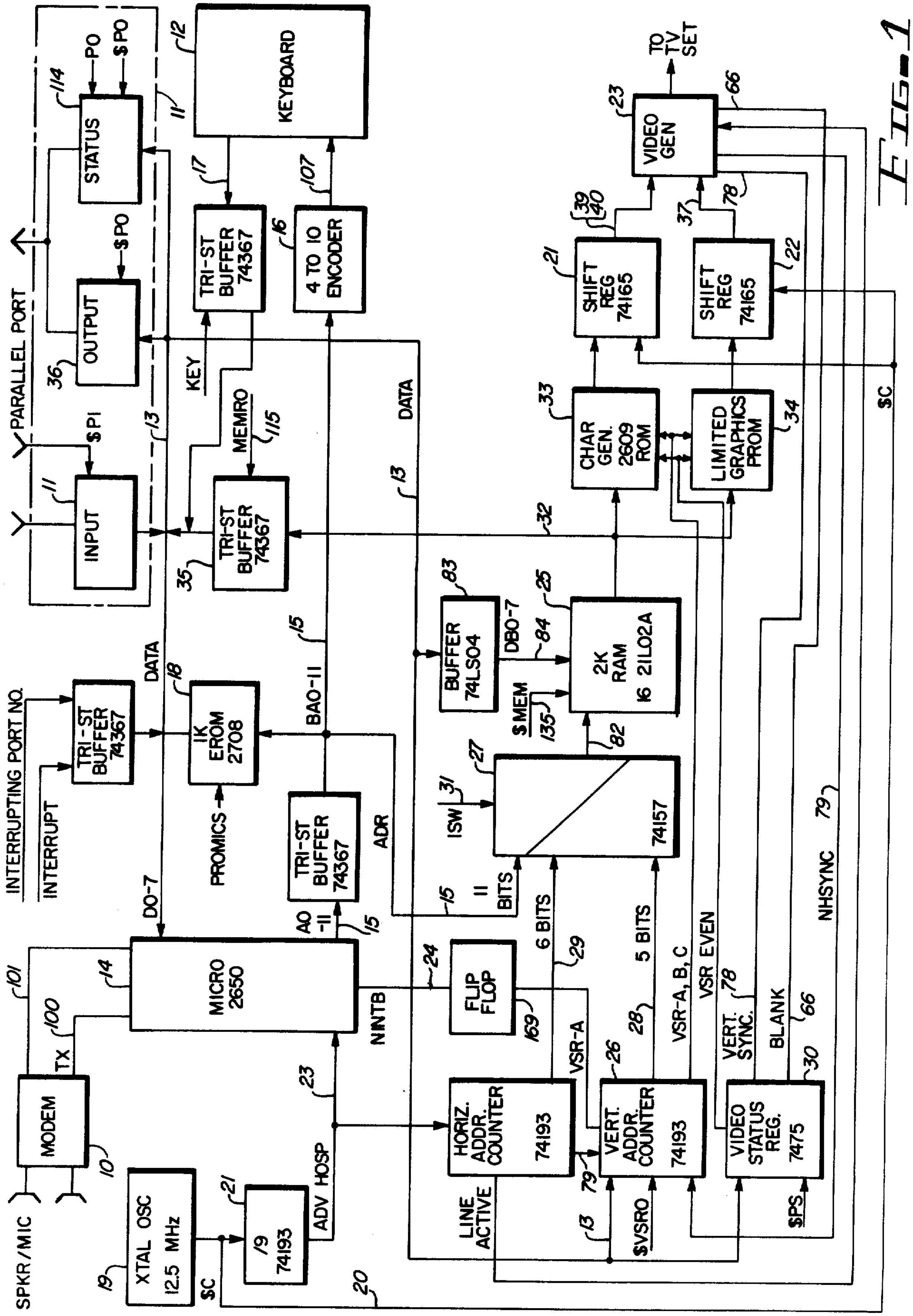
FIG. 1 is a block diagram of the overall system.

Turning now to FIG. 1, the major elements of the system are shown linked together in their overall functional relationship. Data to be displayed enters the terminal either through modem 10, parallel port 11 or keyboard 12. Data from keyboard 12 or parallel port 11 goes to microprocessor 14 over data bus 13.

Microprocessor 14 serves to scan keyboard 12 utilizing address bus 15 and four line to ten decoder 16. By combining the outputs on sense lines 17 caused by closure of keys on keyboard 12 with the address bit pattern on the portion of the address bus 15 causing the particular outputs on sense lines 17 (scan lines 107, see FIG. 14), microprocessor 14 determines which key has been depressed and encodes this data into the proper character in ASCII code.

Modem 10 handles serial input and output for microprocessor 14 by linking it to another device through the telephone lines or some other communications network. Two pairs of frequencies, one pair for transmitting and one pair for receiving are used for frequency shift keying modulation.

Erasable Read Only Memory (EROM) 18 holds the series of preprogrammed instructions that microprocessor 14 executes in controlling the functions of the terminal. The program can be changed to suit individual user needs and serves only to define the functionality of the general purpose microprocessor 14 in the overall functionality of the apparatus disclosed herein. The particular algorithm of the preferred embodiment consists of a main program loop that is interrupt driven by the NINTB signal set by vertical address counter 26 via flip flop 169 and line 24. The main loop controls the vertical sync and blanking by counting interrupts. The interrupt function also provides the timer base for scanning of the keyboard, parallel port flags and modem. At different intervals, the main loop will branch to other subroutines which handle the serial input functon, the serial output function, the keyboard scan, and the parallel port input flag scan. As each character is received, the program must determine what is to be done. Regular characters for display will be stored in the RAM while control characters each cause a separate function such as the graphics option, field reversal, and peripheral attachment of modem, screen and parallel port.

All timing for generation of the video display is developed from a clock 19. The oscillator output C on line 20 is sent to character shift registers 21 and graphics shift register 22 where it is used to shift the character or graphics information dot line byte to video generator 23 one bit at a time. Sixty four characters are displayed on each horizontal scan line, each character comprising a dot matrix nine dots wide and sixteen lines of dots tall. There is room for 89 characters per line but the excess over 64 is used for margins on the left and right. Character shift register 21 or graphics shift register 22 shift out one horizontal row of the dot matrix for every character display time. The character display time is the time it takes to shift out nine dots at a rate of one dot for every period of crystal oscillator 19. A dot time is the inverse of the clock frequency of eighty nanoseconds.

The character times are marked for microprocessor 14 and horizontal address counter 22 by divide by nine counter 21. This is done by generating the Advhosp signal on line 23 every ninth period of the clock. By counting the number of Advhsop signals, microprocessor 14 knows when the end of each horizontal line is reached. By keeping track of the Int B signal on line 24, the microprocessor knows when to turn on the vertical blanking signal, Blank on line 66, and the vertical sync signal, Vert Sync on line 78, via data bus 13.

Horizontal address counter 22 counts out eighty-nine character spaces per line and serves to supply the horizontal address of the character to be accessed from RAM memory 25 via line 29. It also serves to generate the Hsync signal marking the end of each horizontal line and the Line Active signal for horizontal blanking to create the left and right margins.

A vertical address counter 26 serves to keep track of which line is being displayed and, more specifically, which line of the sixteen line tall dot matrix for each character is being traced. Each horizontal sync pulse, Nhsync on line 79, advances vertical address counter 26 one count indicating the trace has moved down one line. Flip Flop 169 is set and reset by the first bit of vertical address counter 26.

The T.V. picture uses interlaced scan such that eight horizontal lines are traced out for each line of characters displayed in a first half frame and another eight during the next half frame. The second half frame is traced in the interstices of the first half frame.

Microprocessor 14 can load the vertical address counter 26 with an initial vertical address count via data bus 13. In this manner, the microprocessor controls the display as page mode or scroll mode by designating the vertical address of the first line to be displayed in each frame. The microprocessor is also used in the preferred embodiment to develop the Blank signal on line 66 and the Vert Sync signal on line 78 by setting these bits in video status register 30 via data bus 13. In other embodiments, the vertical address counter 26 could be used to generate the vertical sync and blanking information.

The vertical character address count from vertical address counter 26 is coupled to a portion of the horizontal and vertical address input of a two line to one line multiplexer switching means 27 on line 28. Horizontal address counter 22 also sends its count, the horizontal character address, to the remaiing portion of the horizontal and vertical address input of multiplexer switching means 27 via line 29.

Multiplexer switching means 27 serves to supply an address to RAM 25 by switching the address from either the address bus 15 coupled to an address bus input or the horizontal and vertical character addresses on lines 28 and 29 coupled to the horizontal and vertical address input. One of these two inputs is switched to the multiplexer output line coupled to the address input of the RAM. Switching is controlled by the ISW signal on line 31 under the control of the address bus 15 of microprocessor 14.

Figure 5:
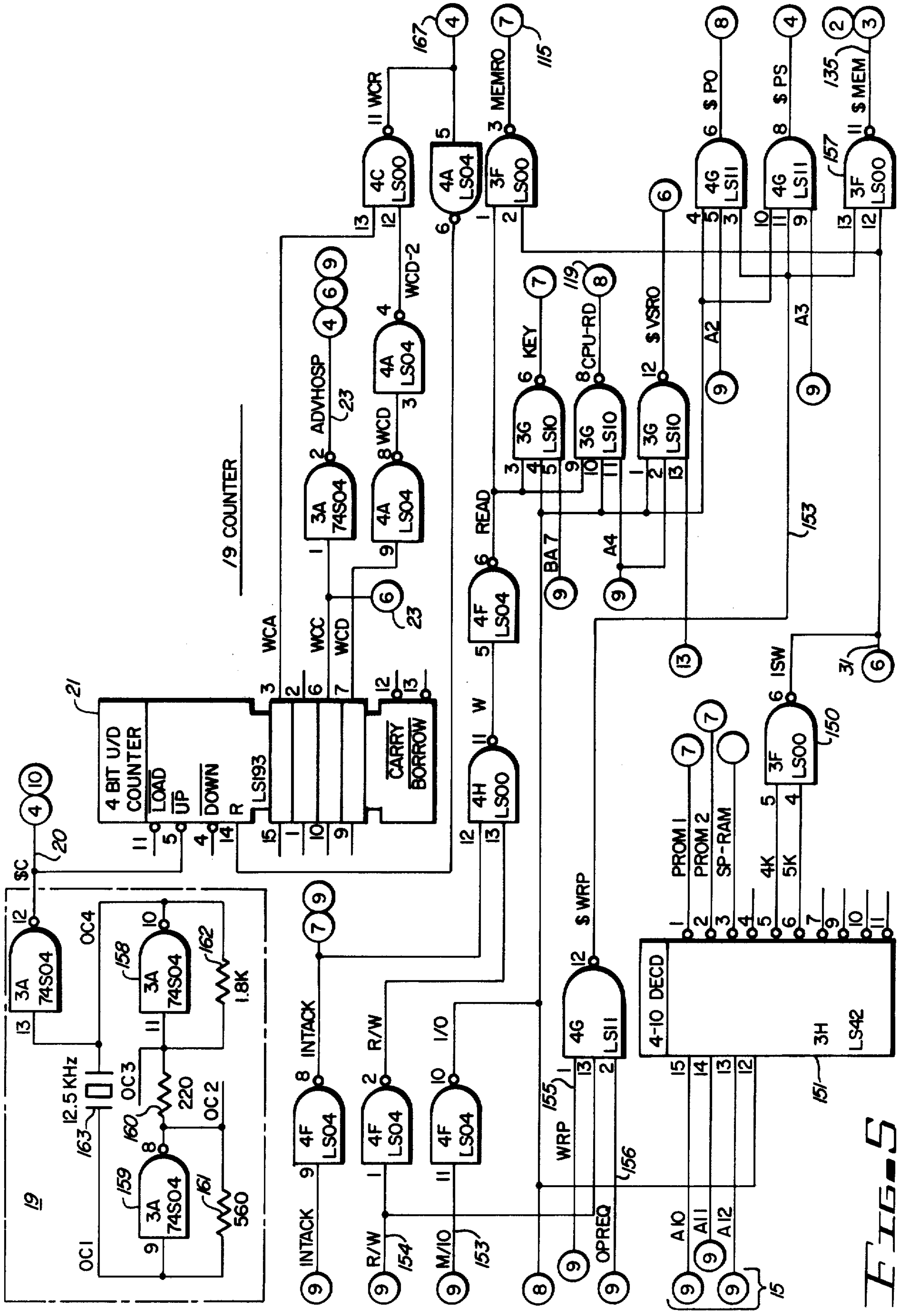
FIG. 5 is a logic diagram of the clock and the divide by nine counter.

Microprocessor 14 serves to fill the RAM with the characters to be displaying one line at a time via the RAM data input lines 84. It does this by writing the ASCII character data from data bus 13 to the memory locations specified to the RAM by address bus 15. Address bus 15 is switched through multiplexer 27 to the address input of the RAM. A SMem signal on line 135, controlled by microprocessor 14, controls whether RAM 25 functions in the read or write mode. Microprocessor 14 simultaneously controls the address switching by multiplexer switching means 27 via the ISW signal on line 31. ISW is controlled by the address appearing on address bus 15 as shown in FIG. 5. When microprocessor 14 is not loading RAM 25, ISW causes the address outputs from the horizontal and vertical address counters to be switched to the multiplexer output line 82 to form an address to access the character data stored in RAM 25. This data is used for display or transmission out from the parallel port or modem or all of the above depending upon the wishes of the operator as indicated by the control characters entered from the keyboard. In other embodiments, preprogrammed binary data may be placed in a ROM and substituted for RAM 25 for applications where the data need not change such as in educational applications. This would eliminate the need for the keyboard, ports, multiplexer and the microprocessor (if the counters were modified to supply vertical sync and blanking signals).

The character data output from the RAM leaves via output line 32 and forms a character data input for both the character generator ROM 33 and the limited graphics PROM 34. These read only memories are programmed with groups of bytes representing the specific dot patterns of light and dark dots recognizable by humans as the ASCII set of alphanumeric characters or any of the sixty four special graphics patterns capable of being displayed by the terminal. Graphics PROM 34 uses the low order six bits of the data from the RAM to display a 2×3 pattern in place of the ASCII character. This graphics capability can be visualized by dividing the 9×16 character dot matrix into six rectangular regions in 2×3 matrix arrangement. One of the six low order bits used for graphics is assigned to each rectangle. If a particular bit is on, then its corresponding rectangle will be lit on the screen by a dot pattern output from graphics shift register 22 which corresponds to lighting all the dots in the 9×16 dots matrix within the particular rectangle to be lit. Both the character generator ROM 33 and the limited graphics PROM 34 output a dot line byte in parallel format in reponse to the character data presented at their respective inputs. The first three bits of the vertical address counter output are used by these memories to determine which line of dots in the vertical dimension of the matrix to retrieve and present at the dot line output. This dot line byte is sent to the character shift register and graphics shift register in parallel format and is shifted out therefrom serially at the rate of one dot for every period of the clock.

By activating tri-state buffer 35 via the Memro signal on line 115, the output character data from the RAM can be directed out parallel port 11 via output register 36 and to microprocessor 14 via data bus 13 for transmission by modem 10. The Memro signal is controlled by microprocessor 14 as shown in FIG. 5.

Video generator 23 combines the video information received from character generator ROM 33 or limited graphics PROM 34 with the horizontal and vertical sync signals and blanking signals to form the composite video output signal Vout on line 136 to the T.V. set. The Vout signal is approximately two volts for white information and 0.75 volts for black information, with sync information dipping to the zero volt level if negative going sync is used. If positive sync is used, the order is reversed i.e., sync is +5 volts and white is about +0.75 volts. The output from the video generator is fed into the video amplifier of the T.V. set used for display.

FIG. 4 details the operation of the logic of video generator 23 and character generator ROM 33. To better understand it, a more detailed explanation of the T.V. picture is necessary. The raster of any T.V. picture is comprised of many parallel horizontal lines traced across the screen by an electron beam. The intensity of this beam is varied to cause small phosphorous dots affixed to the screen which the electron beam hits to emit light of an intensity proportional to the intensity of the electron beam. As the beam sweeps across the screen a line of glowing phosphorous of varying shades of black and white will be formed.

In a computer terminal application we are interested in displaying a few lines of characters on the screen. To do this each character must be broken down into a matrix of light and dark dots in a pattern recognizable by the operator as the desired character. In the preferred embodiment disclosed herein. the dot matrix is nine dots wide and sixteen lines of dots tall. Sixty four of these dot matrices or characters will be displayed on each line of characters put on the screen. A line of characters will require sixteen horizontal lines, one for each line of dots in each character dot matrix.

Figure 6:
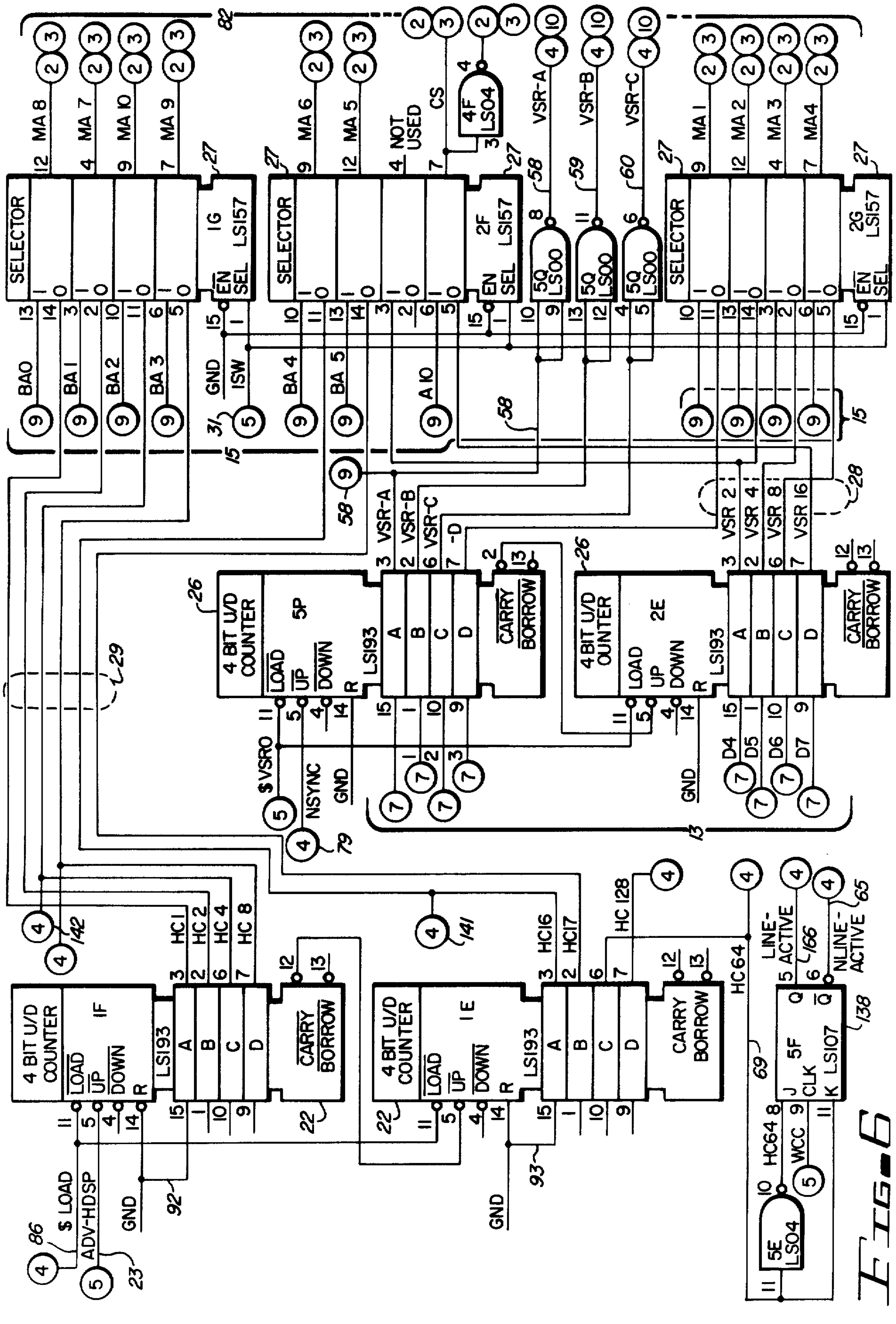
FIG. 6 is a logic diagram of the horizontal and vertical counters and the two line to one multiplexer switching means.

The clock frequency is 12.6 mhz and has a period of one dot time or 80 nanoseconds giving a total character dislay time of 720 nanoseconds. The period of one line therefore is 64 microseconds comprised of 57 microseconds for the sweep to go from left to right and 7 microseconds to return to the left side of the screen. The dot must be turned off for the retrace and to create blank left and right margins on either side of the displayed test. This is the purpose of the Nline-Active signal on line 65. In order to ensure that there is an adequate border at the left and right of the display, only 48 microseconds of the 57 microsecond sweep time is actually used for display of characters. Referring to FIG. 6, it is seen that the Nline-Active signal is controlled by the HC64 bit from horizontal address counter 22. This counter is advanced once for very character display time by the Advhosp signal on line 23. When a count of 64 is reached, HC64 foes high. This resets flip flop 138 causing Nline-Active to go high thereby grounding line 50 and darkening the screen until HC64 again goes low. When a count of 72 is reached, gate 139 in FIG. 4B generates the S Load signal on line 86 thereby clearing flip flop 140. The resulting low NHsync signal on line 79 propagates through gates 88 and 90 in FIGS. 4A and 4B and grounds Vout on line 136 via the Sync signal on line 81. Flip flop 140 is set when the HC16 and HC4 bits on lines 141 and 142 are high. At the count of 72, Horizontal Address Counter 22 in FIG. 6 is preset to a −17 count by the S Load signal on line 86 to the $\overline{\text{Load}}$ input and hardwire grounds 92 and 93 to the "A" inputs. All floating inputs go high or stay high when S Load occurs. Thus HC64 remains high causing Nline-Active on line 65 to remain high thereby blanking the scan. The horizontal address counter 22 then begins counting forward to zero. At a count of −11, both HC16 and HC4 on lines 141 and 142 in FIG. 4 go high setting flip flop 140 and raising the Hsync signal. When the count reaches zero, HC64 goes low thereby lowering Nline-Active on line 65 and enabling the display.

The T.V. picture is comprised of 262½ parallel, horizontal lines trace at a rate of thirty frames per second. Interlaced scan is used. Thus a thirty frames per second tracing rate as used here means 60 half frames are traced every second with each half frame comprised of 262½ lines. The next half frame of 262½ lines are interlaced between the lines of the previous half frame. At 525 lines per frame and 30 full frames per second, the T.V. horizontal sweep frequency is 15,750 lines per second. The vertical sweep frequency is therefore 60 half frames per second.

Both the T.V.'S horizontal and vertical sweep oscillators must be locked in sync with the character data to be displayed from the RAM to make an intelligible picture. To accomplish this synchronization and to establish blank margins at the top and bottom and left and right of the twenty-four lines of displayed test, four signals must be developed. Synchronization of the horizontal sweep oscillator is accomplished by the Hsync signal on line 79 and synchronization of the vertical sweep oscillator is accomplished by the Vert. Sync signal on line 78. Blanking of the video information from the right of the last character in a line of test through retrace and up to the first character in the next line is accomplished with the Nline-Active signal on line 65. The Blank signal on line 66 causes blanking from the right of the last character of the last line of the twenty-four lines of text through tracing of the lower blank margin, vertical retrace and through tracing of the top margin to the first character of the first line of test in the next frame.

Horizontal address counter 22, vertical address counter 26 and microprocessor 14 generate these four synchronization and blanking signals. The horizontal address counter counts out the eighty nine character display periods in each line and causes the Nline-Active signal to blank out the video signal to the left and right of the sixty four characters displayed in each line of test. The horizontal address counter also causes the Hsync signal to be generated at the end of each line.

Figure 9:
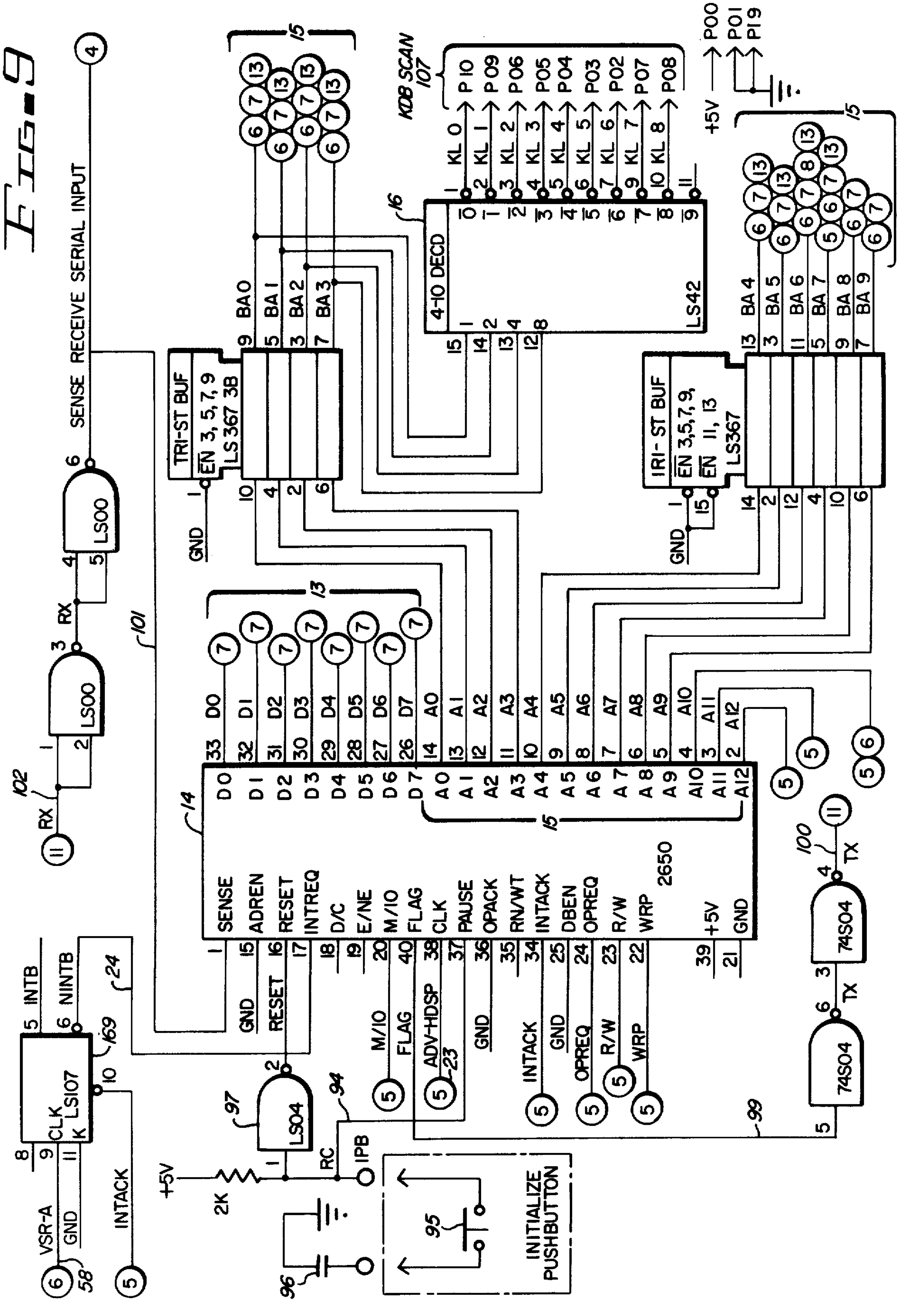
FIG. 9 is a logic diagram of the microprocessor, address bus, and keyboard output.

The Nhsync signal on line 79 in FIG. 9 drives the vertical address counter 26 at the $\overline{\text{UP}}$ count input. This counter provides the vertical address data of the line being traced. This vertical address is used by RAM 25 in accessing the character to be displayed. The first bit of the output, VSR-A, is used to set the interrupt flip flop 169 in FIG. 9. This flip flop sends an NINTB signal to the Intrea input of microprocessor 14 for every positive pulse or high state of VSR-A. Since VSR-A toggles at every Nhsync signal, microprocessor 14 is interrupted every second line in each half frame.

The Vert Sync and Blank signals are controlled by microprocessor 14 by setting or resetting of the Vert Sync and Blank bits of video status register 30 in FIG. 4. The microprocessor decides when to turn Vert Sync and Blank on and off by counting interrupts. Four subroutines each starting at a different interrupt count are used to do this. One routine turns on the screen to start the display. The first thing it does is load the vertical address counter with the address of the first line to be displayed. By controlling this address, either the scroll mode or page mode of display can be used. The routine then loads an internal register in microprocessor 14 used to keep track of the interrupt count with the count at which the next subroutine is to be entered. This internal register is decremented at each interrupt until the count reaches zero at which time the next subroutine is entered. Finally, the routine starts the dislay by turning the Blank signal off. This allows gate 77 to enable gate array output line 50 thereby enabling video information to be developed on the Vout line 136. The twenty-four lines of text are then displayed with each interrupt decrementing the internal interrupt count register.

The Blank signal must be turned back on at the end of the last line of text. A second subroutine, which is entered when the interrupt count register reaches zero, performs this task. It also resets the interrupt count register to another count such that a third subroutine will be entered after the last line of the half frame has been traced. Finally it checks to see if the half frame being traced is even or odd scan and sets the VSR-EVEN bit of video status register 30 in FIG. 4A.

The third subroutine functions to turn on the Vert Sync bit ("on" equals "low") to cause vertical flyback of the electron beam from the bottom to the top of the screen. The Vert Sync signal on line 78 in FIG. 4 is gated through gates 88 and 90 to ground the Vout line 136. The microprocessor keeps the Vert Sync bit on for three interrupts by setting the internal interrupt count register to three. Thus, the fourth subroutine will be entered three interrupts later to turn the Very Sync bit off. Because interlaced scan is used, the Vert Sync signal must be triggered in the middle of the last line in every other half frame. The third subroutine functions to provide for this delay depending upon whether the scan is even or odd as determined by the second subroutine.

The fourth subroutine serves to turn the Vert Sync bit off at the top of the new half frame. It also sets the interrupt count register to the count necessary to branch to the first subroutine to turn off the Blank signal at the beginning of the first line of test so as to provide a top margin of blank lines. This subroutine also toggles an internal scan bit changing the type of scan from even to odd or odd to even. These four subroutines are each executed once for each half frame and are merely illustrative of the scheme used in the preferred embodiment. Other programs may be used or the microprocessor may be eliminated altogether in some embodiments.

As described earlier, each of the twenty-four text lines of characters displayed per frame consist of sixteen horizontal lines of dots. Four of these 16 lines, two at the top and two at the bottom, are left blank in the preprogrammed matrices stored in the character generator ROM 33. These four blank lines of dots act as spacers between the lines of test. In all, 384 lines of the frame are used for the twenty-four text lines, the remaining available lines being used as top and bottom margins.

Figure 4A:
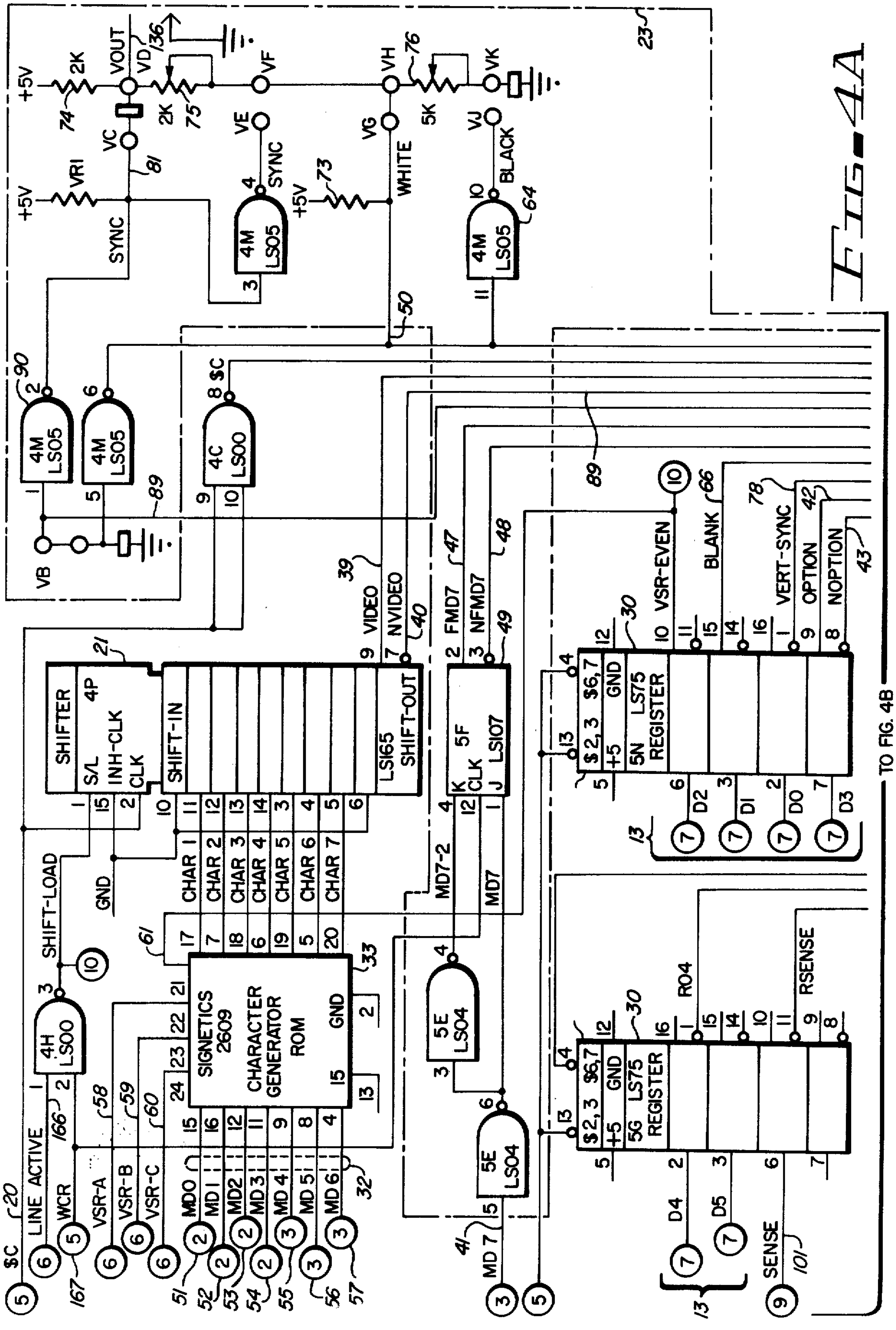
FIGS. 4A and 4B are a logic diagram of the video generator
Figure 10:
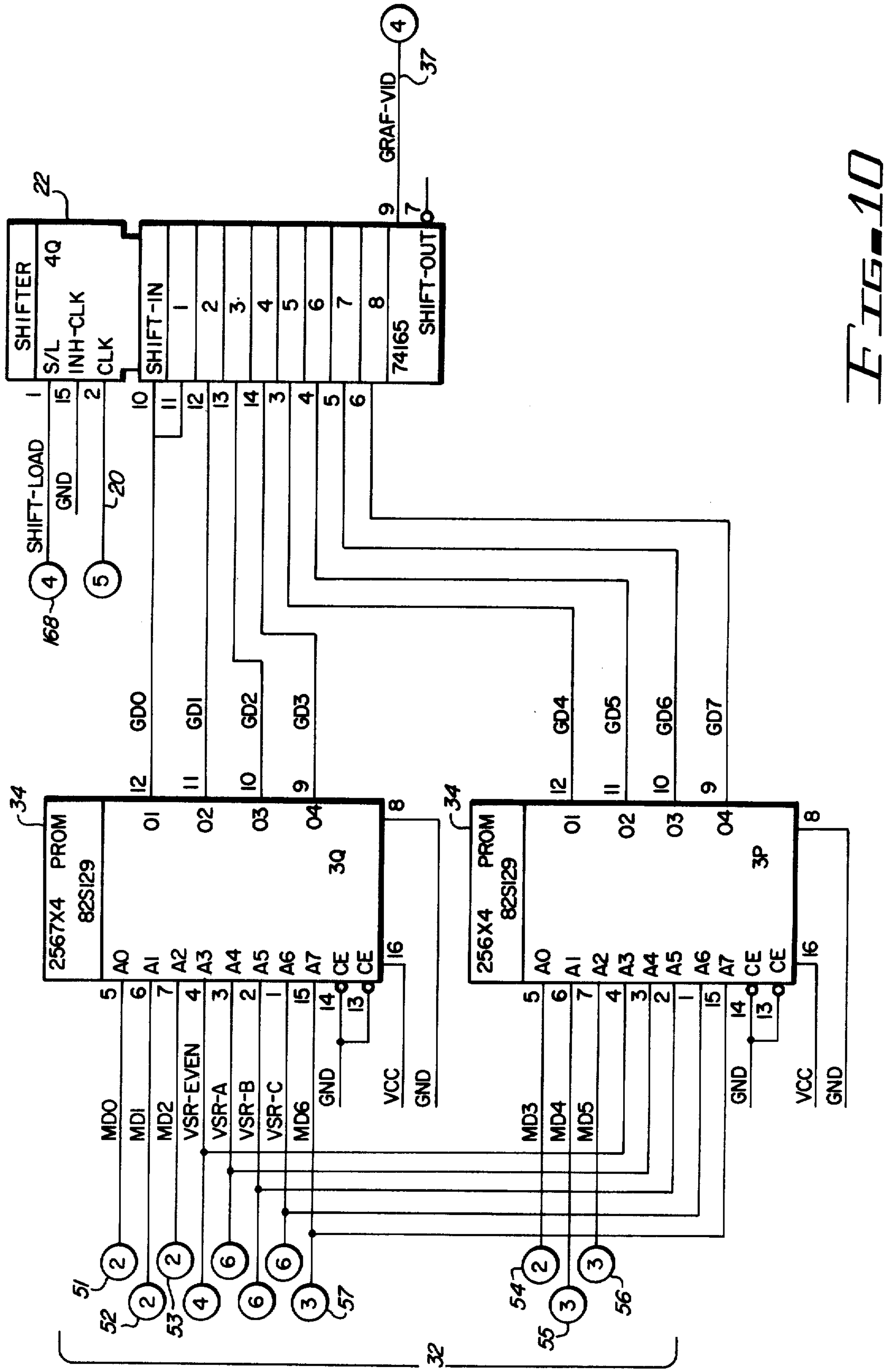
FIG. 10 is a logic diagram of the graphics option.

The output signal of clock 19, ∮C on line 20, is fed to character shift register 21 and graphics shift register 22 in FIG. 4A. Character generator 33 loads character shift register 21 in parallel format with seven binary bits representing one horizontal line of the dot matrix of the character to be displayed. Two dots of the nine, one on the left and one on the right, are left blank (logical zero) for spacing purposes. These bits are shifted out one per clock cycle on line 20 as the video and Nvideo signal on lines 39 and 40. A similar situation occurs with graphics shift register 22 and graphics PROM 34 in FIG. 10. The graphics video information is the Graf-Vid signal on line 37 in FIGS. 10 and 4.

Figure 4B:
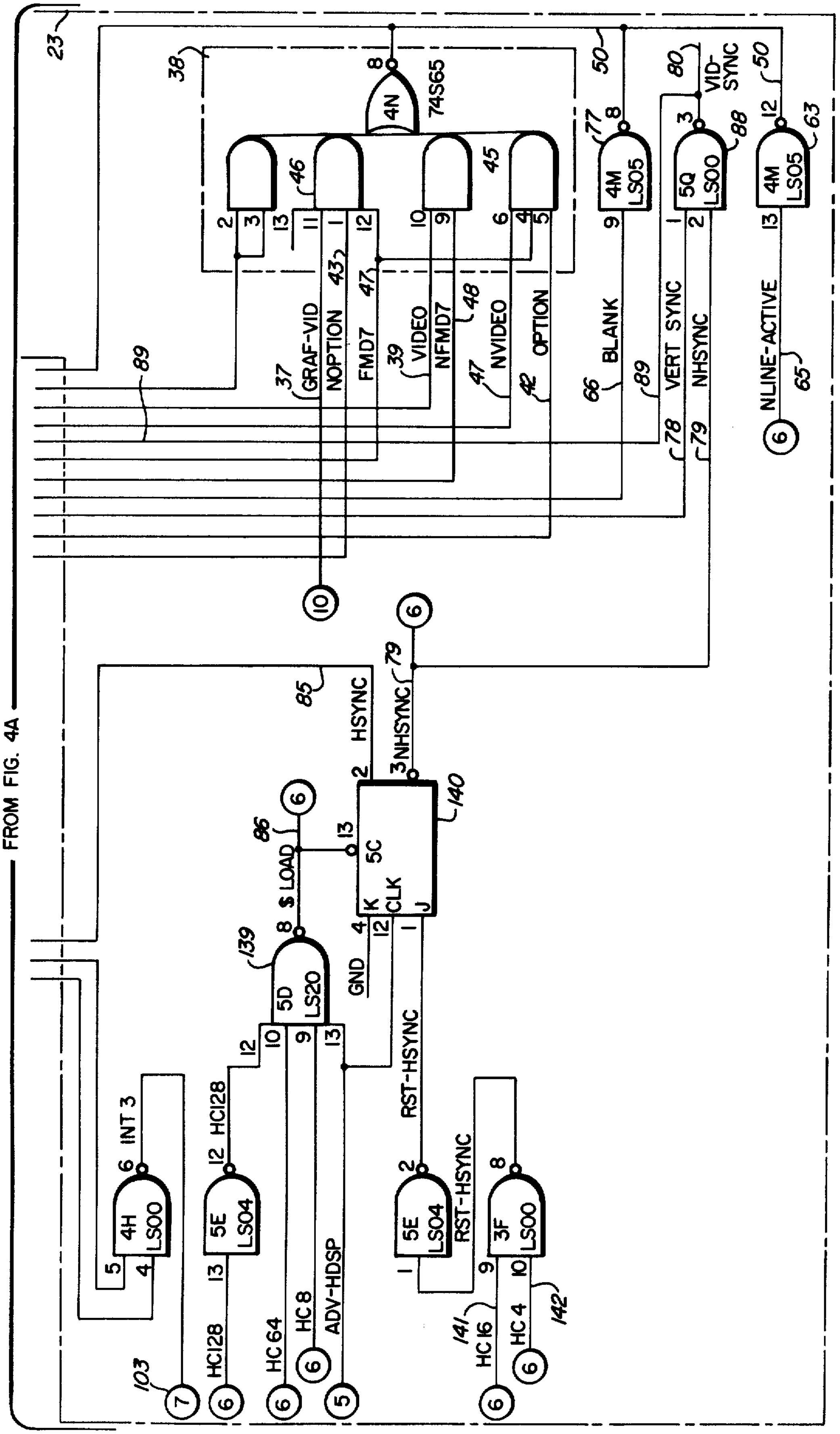

The video information from shift registers 21 and 22 enters gate array 38 in FIG. 4B. This gate array can be a 74 S 65 integrated circuit in the TTL family of the and-or-invert gate variety. Only one gate of this array is used at any one time to gate dot pattern video information through to the T.V. set.

The reason four gates are needed for the video gating function performed by gate array 38 is to accommodate the terminal field reversal and graphics option capability. Each character can be displayed as either white on a black field or black on a white field. The eighth bit of memory storage of each character is used to determine the field setup. This bit, MD7 on line 41, will cause a black on white display when it is off and the graphics option (controlled from the keyboard) is off. The graphic option status is set by the microprocessor in response to a control character from the keyboard. The microprocessor sets the option bit of video status register 30 in FIG. 4A via data bus 13.

As seen from FIG. 4B, when the graphics option is off, gates 45 and 46 have opposite signals at their inputs such that Graf-Vid signal on line 37 is barred and the Nvideo signal on line 40 is allowed through to the T.V. set. Field format is reversed with the Video and Nvideo signals. Nvideo is gated through if the FMD7 and NFMD7 signals are in one state and the Video signal on line 39 is gated through if FMD7 and NFMD7 are in the opposite state. The FMD7 and NFMD7 signals on lines 47 and 48 indicate the state of field reversal flip-flop 49 and control whether the display is black on a white field or white on a black field. The state of this flip flop is controlled by the state of the MD7 signal (the seventh bit of the character word stored in memory) on line 41. A control O is entered from the keyboard to reverse the field format. A control N is entered from the keyboard to enable the graphics option.

It is seen from the above that, depending upon the states of the field reversal flip flop 49 and the graphic option signals on lines 42 and 43, several different display possibilites are presented. Summarizing these possibilities:

| MD7 | Graphics Option | Display Type |
|---|---|---|
| off | off | Black on White |
| on | off | White on Black |
| off | on | Black on White |
| on | on | Graphics Option |

The output of gate array 38 on line 50 will be high if the screen is to be whie and will go low for black for negative sync.

Character generator 33 needs a character data input for providing the address from which to retrieve the dot line byte comprising one line of dots in the character dot matrix. The seven bits of ASCII code for the character to be displayed are presented to the character generator on lines 51-57 as the MDϕ-6 signals in FIG. 4A from the RAM 25 (shown in FIGS. 2 and 3). Three other signals, VSR A, B and C on lines 58-60 respectively plus VSR-Even on line 61 form the address where a dot line byte from the dot matrix comprising the character to be displayed may be found. The VSR A, B and C signals represent the first three bits of the vertical address from vertical address counter 26 (shown in greater detail in FIG. 6). These three bits tell character generator 33 which horizontal line of dots to display of the sixteen lines of dots in the vertical dimension of the dot matrix. The MDϕ-6 signals make up the address of the dot matrix of the character to be displayed and represent the balance of the vertical address. VSR-Even on line 61 indicates which half of the frame is being displayed and is controlled by bit D2 on the data bus 13 from the microprocessor 14 which is serviced by the second subroutine described earlier.

Character shift register 21 receives the parallel format dot line byte from character generator 33, as the Char 1-7 signals. This shift register shifts the dot line byte out serially as the Video and Nvideo signals on lines 39 and 40 of FIG. 4A at the rate of one dot for every cycle of the ∮C signal on line 20. These data bits propagate through gate array 38 and into the adjustable sync network 62.

The Line-Active signal on line 65 feeds open collector inverters 63 and 64 so as to darken the screen from the right of the last character in the line of text through retrace and then right again to the first character in the next line. The Line-Active signal on line 65 is controlled from Line-Active flip flop 68 in FIG. 6 which is itself controlled by the HC64 bit on line 69 from horizontal address counter 22. Line-Active is high when HC64 is low.

Likewise, the Blank signal on line 66 serves to blank (force to black) the video output from gate array 38 on line 50 from the end of the last line of text through vertical retrace and through the top margin up to the first character in the first line of text in the next frame. The Blank signal is controlled by microprocessor 14 through the D1 bit of data bus 13.

Figure 13:
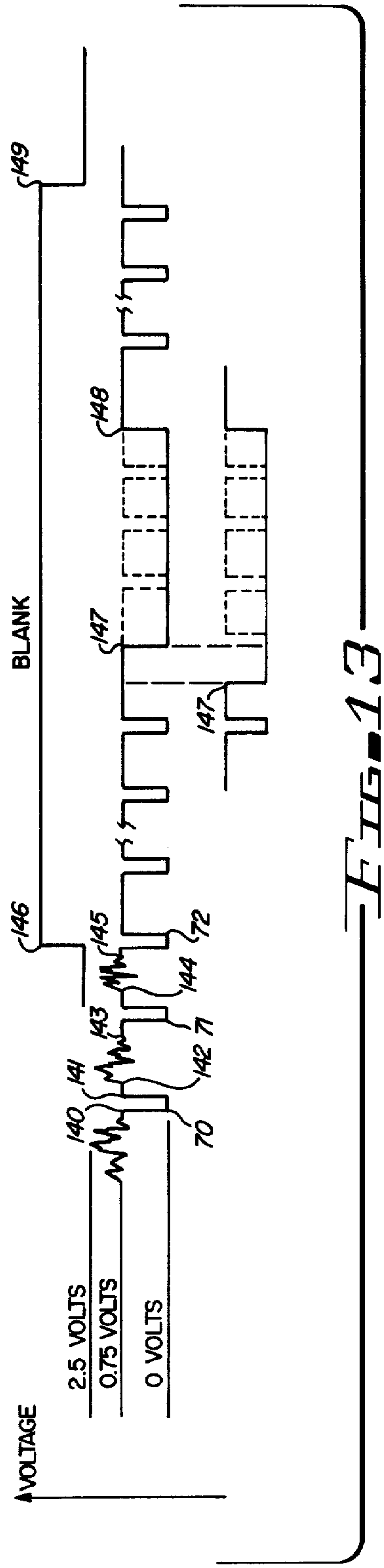
FIG. 13 is a drawing of the composite video signal.

The composite video output signal to the T.V., Vout on line 136, is illustrated in FIG. 13. Negative going horizontal sync pulses are shown at 70, 71, 72 etc. When these pulses fall to zero volts, the horizontal sweep oscillator in the T.V. forces the electron beam to return to the left side of the screen. In FIG. 13 the effect of the Line Active and Hsync signals is seen clearly. Point 140 corresponds to a count of seventy two at the outputs of horizontal address counter 22 in FIG. 6. At this point, the counter is preset to a −17 count as explained earlier. Point 141 in FIG. 13 represents the point in time when horizontal address counter 22 reaches a −11 count and resets flip flop 140 in FIG. 4B. Point 142 represents a zero count and the setting of the Line Active flip flop 138 in FIG. 6. The time between points 141 and 142 represents the time when the NLine-Active signal on line 65 in FIG. 6 is high resulting in grounding of line 50 in FIG. 4 and blanking of the screen. From point 142 to 143 in FIG. 13 represents the video information of the dot patterns being displayed. Point 143 also represents the achievement of a count of sixty four by horizontal address counter 22 and the raising of NLine-Active. The resultant grounding of line 50 forces the video signal to black again until the horizontal address counter again reaches zero at point 144. It can be seen from the foregoing that the NLine-Active signal is responsible for creating the margins at the left and right of the display.

The margins at the top and bottom of the display are created by the Blank signal on line 66 in FIG. 4. In FIG. 13, point 145 marks the end of the last line of text. At this time, the Blank signal is turned on by microprocessor 14 with the triggering event being transmission of the Hsync signal at the end of the last line of text in the half frame at point 146. Several more blank horizontal lines are traced below the last line of text while the Blank signal is on until microprocessor 14 has counted enough Hsync signals to indicate the last line in the half frame has been traced. At point 147, Microprocessor 14 sets the Vert Sync bit on via data bus 13. Microprocessor 14 is programmed to hold the Vert Sync signal on for at least three horizontal line periods such that the internal circuitry of the television set can distinguish between the vertical and horizontal synchronization signals. At point 148, Vert Sync is turned off by microprocessor 14 and horizontal tracing begins anew. The Blank signal has been on all the time however so the horizontal lines traced are blank. In this manner a top margin is created. At point 149, the Blank signal is turned off and character display for the next half frame begins. Microprocessor 14 is programmed to delay point 147 in time one half of a horizontal line scan time every other half frame. In this manner vertical flyback occurs in the middle of the last line every other half frame thereby returning the electron beam to the middle of the first line. Interlaced scan is achieved in this manner since the middle of a "horizontal" line is below the left end thereof by an amount equal to half the drop of the line.

The video data portion of Vout will reach its most positive point with all the input gates of gate array 38 disabled. Resistor 73 in FIG. 4A serves as a pullup resistor for the open collector gates of gate array 38. The high voltage level of Vout will be controlled by the voltage divider formed by 2 K resistor 74 in series with potentiometers 75 and 76. If any of the gates of array 38 or the Line-Active gate 63 or the Blank gate 77 is enabled, then line 50 is grounded. The Vout potential is then developed across only potentiometer 75 of the aforementioned voltage divider thereby dropping Vout to a lower voltage. With either the Vert Sync signal on line 78 or the NHsync signal on line 79 enabled (low), the Vid-Sync signal on line 80 is in the logical one state causing the sync signal on line 81 to ground Vout.

The adjustable sync network 62 allows changes in the terminal circuitry to be made such that the terminal is compatible with television sets with positive sync. The sync pulses in positive sync sets are positive going to the +5 volt level while black is at the next highest level (around 2.75 volts) and white is the lowest level (around 0.75 volts). The adjustable sync network 62 provides spots for making suitable cuts and adding suitable jumpers such that inverters may be added to invert both the video information on line 50 and the sync information on line 89 such that the above voltage scheme may be achieved.

Figure 2:
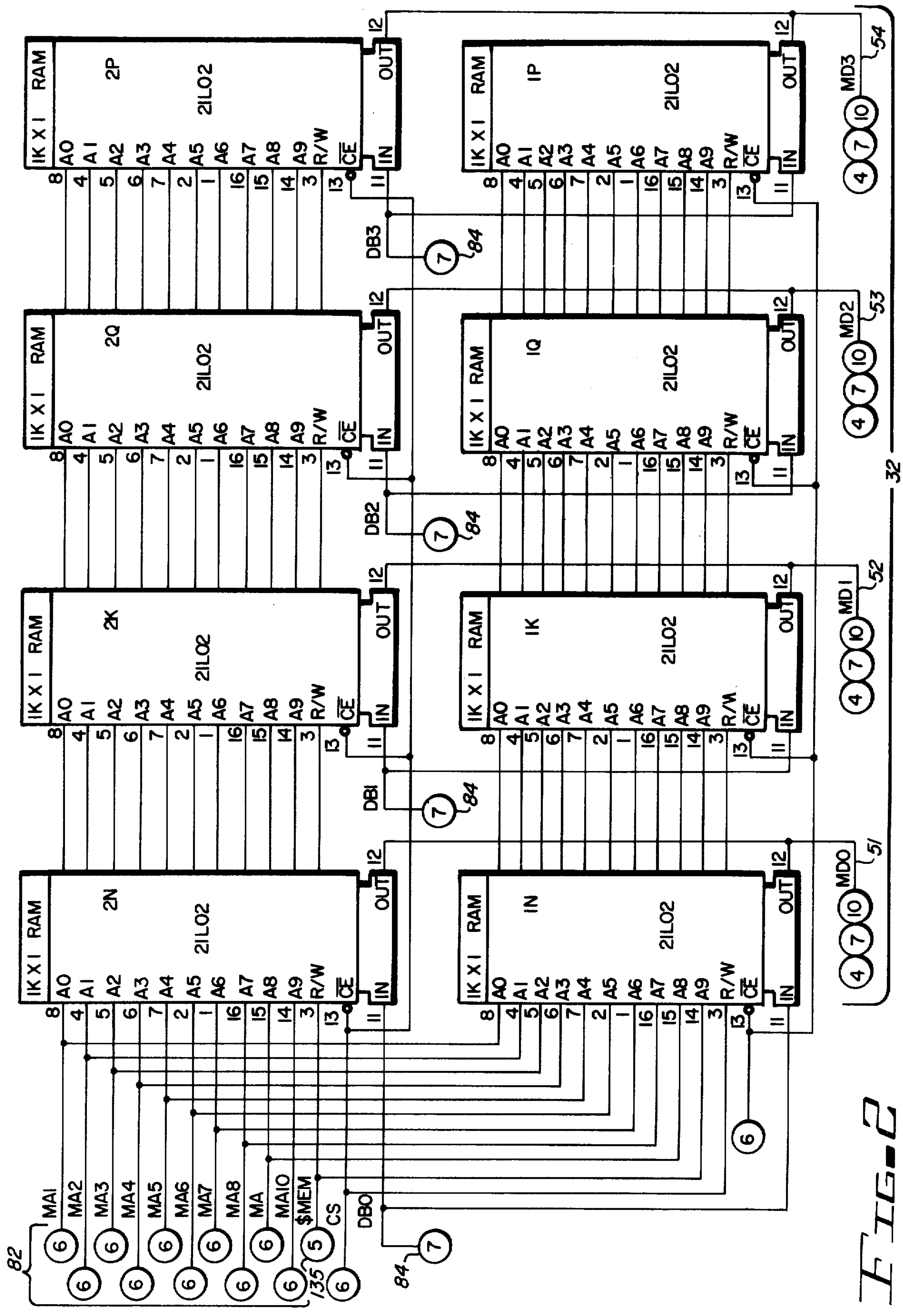
FIG. 2 and 3 are logic diagrams of the RAM.
Figure 3:
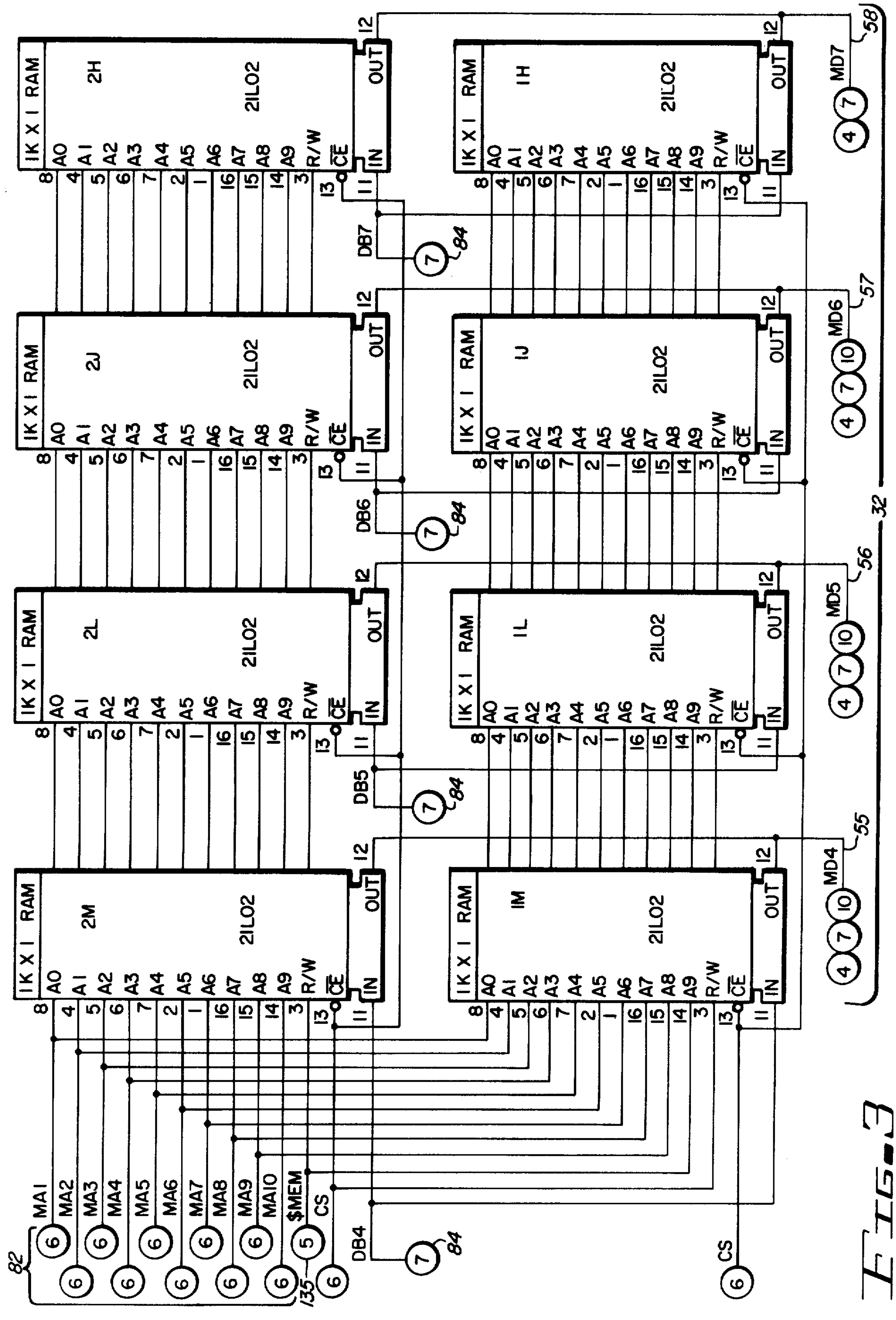

A logic diagram of RAM 25 device is shown in FIGS. 2 and 3. The address to store the incoming character or to retrieve the character to be displayed is supplied via address input lines 82 (MA1–MA10) from two line to one line multiplexer 27 (shown in more detail in FIG. 6). This multiplexer serves to select, under the control of microprocessor 14 via the ISW signal of FIGS. 1 and 5, which set of inputs will be switched to its output lines. FIG. 6 shows the horizontal address counter output lines 29 (HC1, HC2, HC4, HC8, HC16, HC32, HC64) and the vertical address counter output line 30 (VSR-D, VSR2, VSR4, and VSR8) to be connected to the two sets of inputs of multiplexer 27.

Figure 7A:
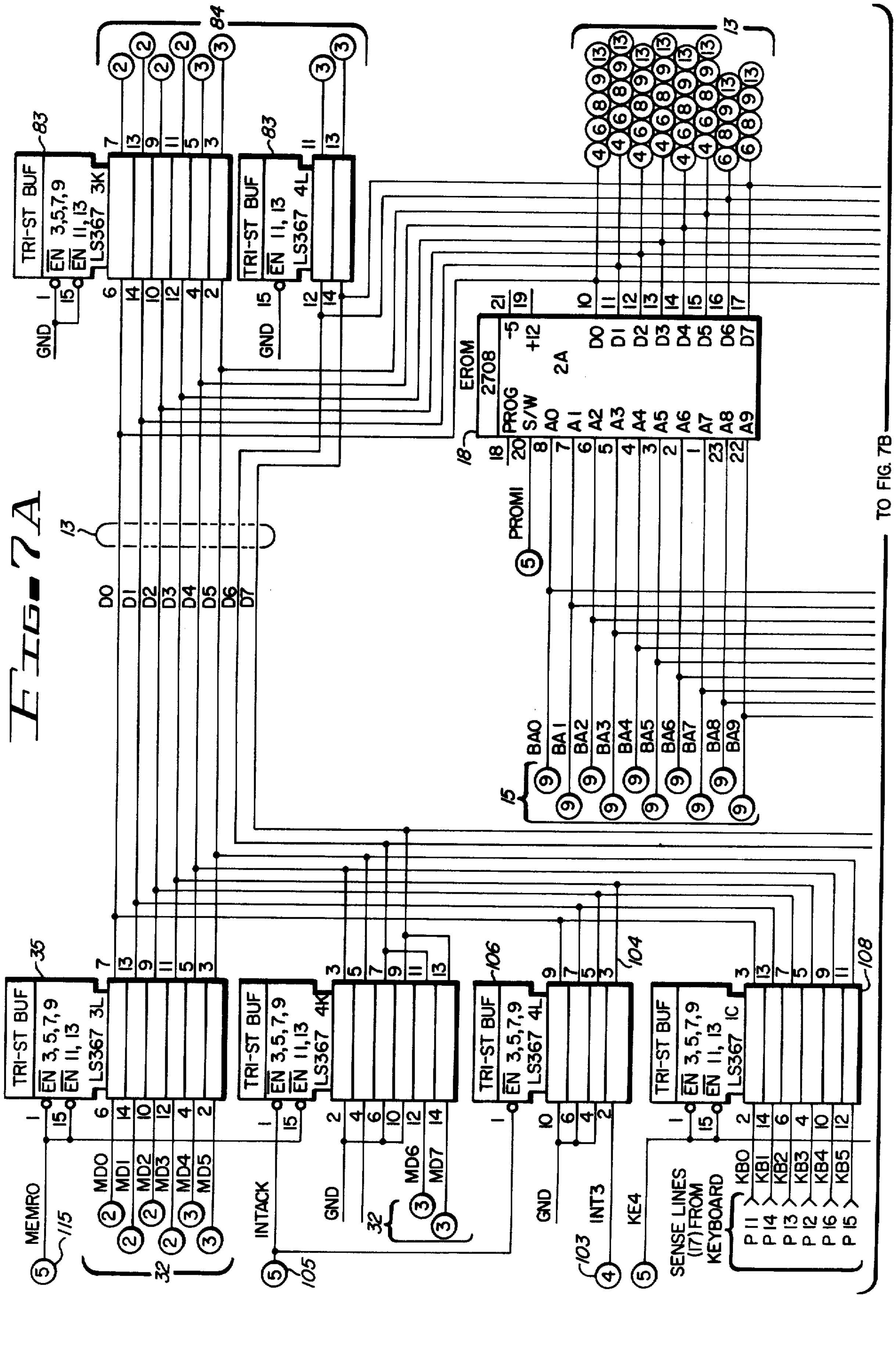
FIGS. 7A and 7B are a logic diagram of the relationship of the EROM program memory to the address and data buses.
Figure 7B:
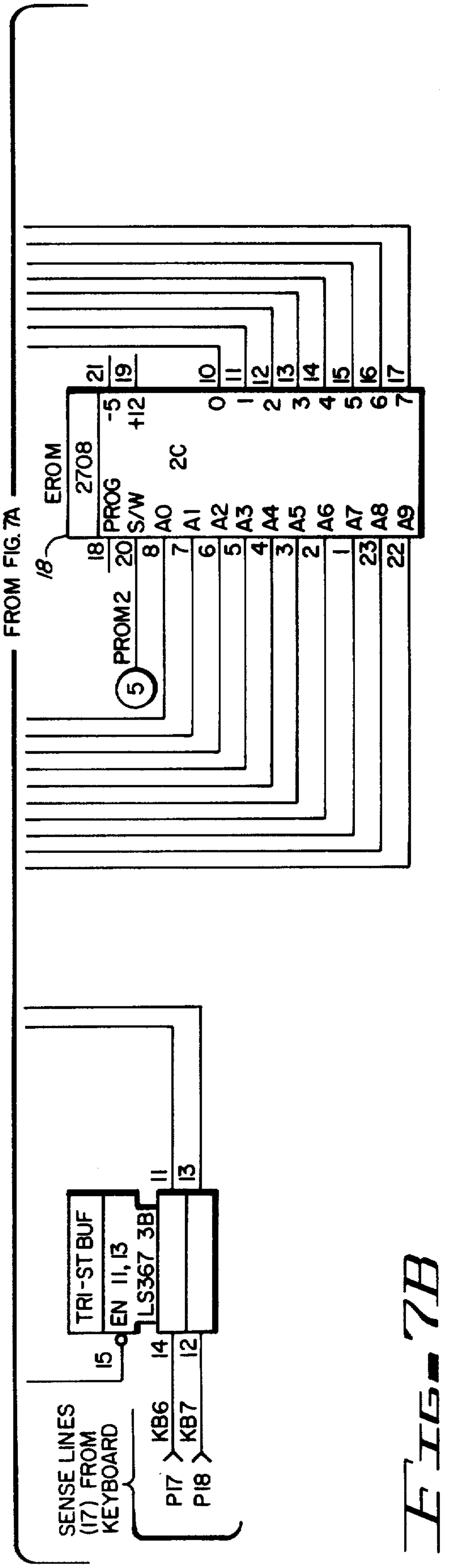

The character to be stored in RAM 25 arrives on lines DBO-7 in FIGS. 2 and 3 from tri-state buffer 83 (shown in more detail in FIG. 7). The character to be displayed leaves the RAM on lines MDO-7 and goes to character generator ROM 33 in FIG. 4A and limited graphics PROM 34 in FIG. 10.

FIG. 6 is a more detailed logic diagram of the horizontal and vertical address counters 22 and 26. Horizontal address counter 22 is used to count the Advhosp signal periods to keep track of the horizontal address of the character being displayed and for control of the horizontal sync and blanking. Between the counts of zero and sixty four, each character in the line of text being displayed is accessed from the RAM. Horizontal address counter 22 is advanced once for each character displayed by means of the Advhosp signal on line 23. When the counter reaches a count of 72 (HC64 and HC8), the Hsync flag, 79 in FIG. 4, is set by the $Load signal, 86 in FIG. 4, from NAND gate 87 (also in FIG. 4).

Each Hsync pulse advances the vertical address counter 26 by one count via the Nhsync signal on line 79. The first three bits of its output, VSR A, B and C, are sent to the character generator ROM 33 via lines 58–60. Output bits VSR 1, 2, 4, 8 and 16 are the vertical address of the line being traced.

FIG. 5 is a more detailed logic diagram of the 12.5 mhz clock 19. Also shown are the logic of the divide by nine counter 21 and some control gates combining various signals from microprocessor 14 to generate several control signals used to control the various tri-state buffers, status registers, counters, and memories in the system.

The ISW signal on line 31 will cause multiplexer 27 to switch the "A" inputs to the output lines 82 when it is low and the "B" inputs to the outputs when it is high. The "A" inputs are connected to the horizontal and vertical address counter outputs and the "B" inputs are connected to address bus 15 as shown in FIG. 6. In FIG. 5, ISW on line 31 is the output of NAND gate 150 which has inputs connected to the "5" and "6" outputs of four line to ten line decoder 151. The "5" output goes low when a binary five appears at inputs 152 and similarly for the "6" output. The outputs of decoder 151 are normally high. The ISW signal will go high then only when the A10–A12 bits and the MI/O signal on line 153 from microprocessor 14 form either a binary 5 or binary 6 indicating microprocessor 14 wants to write to RAM 25. The MI/O signal is a control signal output from microprocessor 14 indicating whether the current operation of the microprocessor references memory or I/O.

The $Mem signal on line 135 serves as the Read/-Write control signal for RAM 25. When it is high the RAM will read data at its data inputs DB0–DB7 in FIGS. 2 and 3 and store it at the address specified at its address inputs MA1–MA10. When $Mem is low, the RAM will write the data stored at the location specified at its address inputs to its data output lines MD0–MD7. The $Mem signal will go low only when ISW is high and the $WRP signal on line 153 is high. $WRP is low only when the R/W signal on line 154, the WRP signal on line 155, and the OPREQ signal on line 156 all are low. The R/W signal from microprocessor 14 is low when the microprocessor wishes to read from data bus 13. The WRP signal from microprocessor 14 is normally low and provides a positive going pulse only when a write operation is being performed. The OPREQ signal is low at all times except when microprocessor 14 wishes to inform external devices that all address, data, and control signals at its pins are valid. Thus it is seen that the ISW signal, when high, gates the $WRP signal through NAND gate 157 to become the $Mem signal. When WRP, OPREQ, and R/W are all high, microprocessor 14 is performing a write operation to the address specified on the address bus 15 and SWRP will be low making $Mem high. This causes RAM 25 to receive the character data on DB0–DB7 (data bus 13) and store it at the address specified on the MA1–MA10 lines. The characteristics of the other control signals of FIG. 5 will be obvious to those skilled in the art in consideration of the system operation and in conjunction with the information on the control signals of the Signetics 2650 microprocessor contained in Signetics components data publications all of which are incorporated herein by reference. The Texas Instruments TTL Data Book, 2d edition, gives electrical data and pin assignments for the various TTL chips in the system and it too is incorporated herein by reference.

Clock 19 utilizes two gates 158 and 159 biased in the active region at threshold by resistors 160–162. Crystal 163 acts as a series resonant circuit to provide a feedback path from the output of gate 158 to the input of gate 159 causing oscillation to occur at the resonant frequency. The output signal, $C, leaves on line 20 and is divided to a lower frequency Advhosp signal by divide by nine counter 21. The Advhosp signal on line 23 occurs every ninth cycle of the SC signal. The Advhosp signal is connected to the "C" output of the counter so that Advhosp occurs in the middle of the count from zero to nine. This is necessary so that horizontal address counter 22 in FIG. 6 changes the horizontal address count while the last horizontal address is causing propagation of character data from RAM 25 through character generator ROM 33 to character shift register 164.

It takes a few hundred nanoseconds to access the character data from RAM 25 and to access the dot pattern from character generator 33 or graphics PROM 34. Therefore, the parallel load command, Shift-Load on line 68 in FIGS. 4 and 10, to character shift register 21 and graphics shift register 22 should be delayed slightly from the time the address of the character to be displayed is presented to the RAM. To create this delay, the Shift-Load signal is derived from the WCR signal on line 167 from FIG. 5. The WCR signal is a pulse of one clock period duration which occurs when divide by nine counter 21 reaches the count of nine. WCR resets the divide by nine counter and causes loading of the character and graphics shift registers by sending Shift-Load low if the Line-Active flag is set. Since WCC on line 23 is on for four counts and off for five during the count to nine, 5×80 or 400 nanoseconds of delay is created between incrementation of horizontal address counter 22 to the next address and loading of a shift register with the dot pattern from the last address.

Microprocessor 14, shown in more detail in FIG. 9, is initialized at powerup by the RC signal on line 94 connected to a resistor-capacitor network. When power is applied via initialize pushbutton 95, capacitor 96 holds the pause input low via line 94. In the meantime, the reset input is held high by inverter 97. As the capacitor charges up, the reset input goes low and the microprocessor commences operation.

Serial input from the modem is handled by microprocesssor 14 via the Sense input on line 101. When no character is being received, the Sense input is high. The program continually interrogates this input to determine when a character is being received, with the beginning of a character indicated by a high to low transition on the Sense input line. Modem 10 drives this Sense input via the RX signal on line 102. The change on Sense line 101 is latched into bit six of video status register 30 in FIG. 4 and changes the Int 3 signal on line 103. The change in Int 3 changes the hardware generated interrupt vector on the next interrupt by changing the information on data bus 13 via line 104 in FIG. 7. When microprocessor 14 receives an interrupt request, it drives the Intack signal low on line 105 in FIGS. 9 and 7 which enables tri-state buffer 106. The lowering of Intack indicates that microprocessor 14 is ready to receive the interrupt vector from the data bus. The interrupting device is responsible for supplying this interrupt vector to the data bus. This occurs with the transmission of Int 3 through tri-state buffer 106 to line 104 which is connected to D3 of data bus 13. The subroutine entered via this interrupt vector sets bit six of the video status register 30 in FIG. 4 to keep the interrupt vector pointed to the new routine. The Sense bit is then periodically tested so that the incoming character may be assembled.

Figure 14:
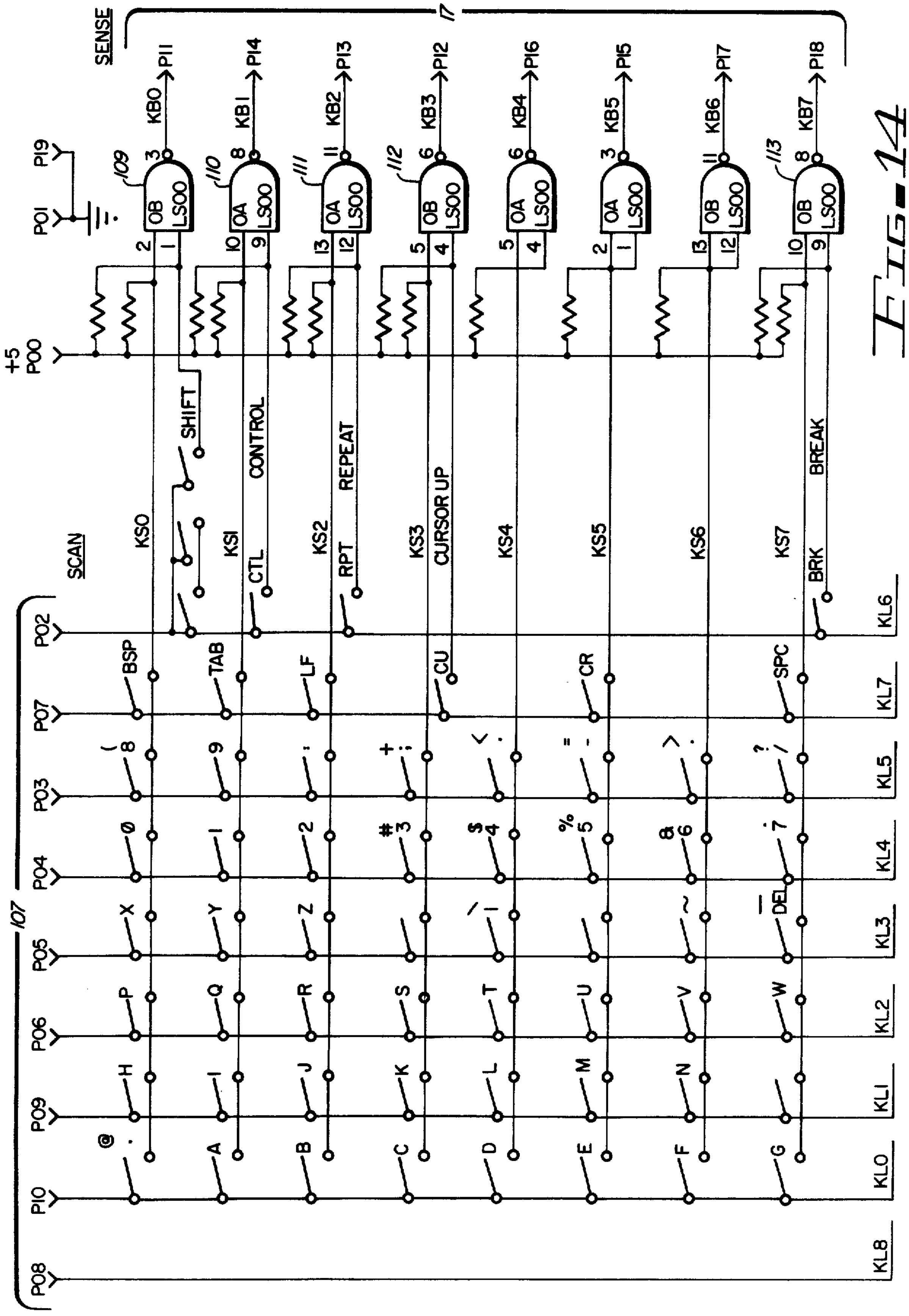
FIG. 14 is a logic diagram of the keyboard.

Microprocessor 14 also scans keyboard 12, shown in more detail in FIG. 14, via Scan lines 107. A seven bit ASCII code is used by the keyboard with the four most significant bits (MSB) represented by the BA0–BA3 lines of address bus 15 in FIG. 9. These lines are decoded by four line to ten line decoder 16 of FIG. 9. Decoder 16 decodes BA0–BA3 into a low on one of the ten Scan lines. These Scan lines are lowered one by one by a series of I/O read instructions executed by microprocessor 14. Each of the Scan lines is connected to one side of a column of switches in the keyboard while each of eight Sense lines 17 are connected to the other side of a row of keyboard switches. These eight Sense lines 17 are selectively switched onto data bus 13 under control of microprocessor 14 by tri-state buffer 108 in FIG. 7. The bits from the Sense lines are encoded by microprocessor 14 into the three least significant bits of the ASCII character code. The shift, control, repeat, cursor positioning and break keys are connected to Sense lines 17 through NAND gates 109–113 respectively to enable use of only eight Sense lines.

A keyboard scan is performed once for each half frame. During scanning of the Scan lines by microprocessor 14, the data from the Sense lines is read and loaded into an internal register of the microprocessor. There the data is tested after each scan for non-zero to indicate a switch closure making it possible to check for depression of two keys simultaneously. When a character is sensed, the scanning is continued. Only when the same character has been sensed several times in succession, does microprocessor 14 assume it is a valid character. This procedure eliminates switch bounce.

A parallel port can be included in the system such that data may be received in parallel format from another data processing device and displayed on the screen. Also, data received from the modem or keyboard may be sent out from the parallel port to the other data processing device at the option of the operator by depressing certain control characters on the keyboard.

The terminal may be thought of as having three input peripherals (keyboard, modem, parallel port) and three output peripherals (screen, modem, and parallel port). The software is written such that, by use of control characters from the keyboard, specific input peripherals may be assigned to one or more output peripherals. A three byte table is used to record the desired attachments. The first byte represents the input parallel port, the second byte is the input line from the modem, and the third byte is the keyboard. If bit seven is on in any of these bytes, then the screen is attached to the input peripherals represented by the bytes with bit seven on. If bit six is on, then the output line to the modem is connected to that particular input peripheral. Likewise, bit five represents the output parallel port.

Figure 8:
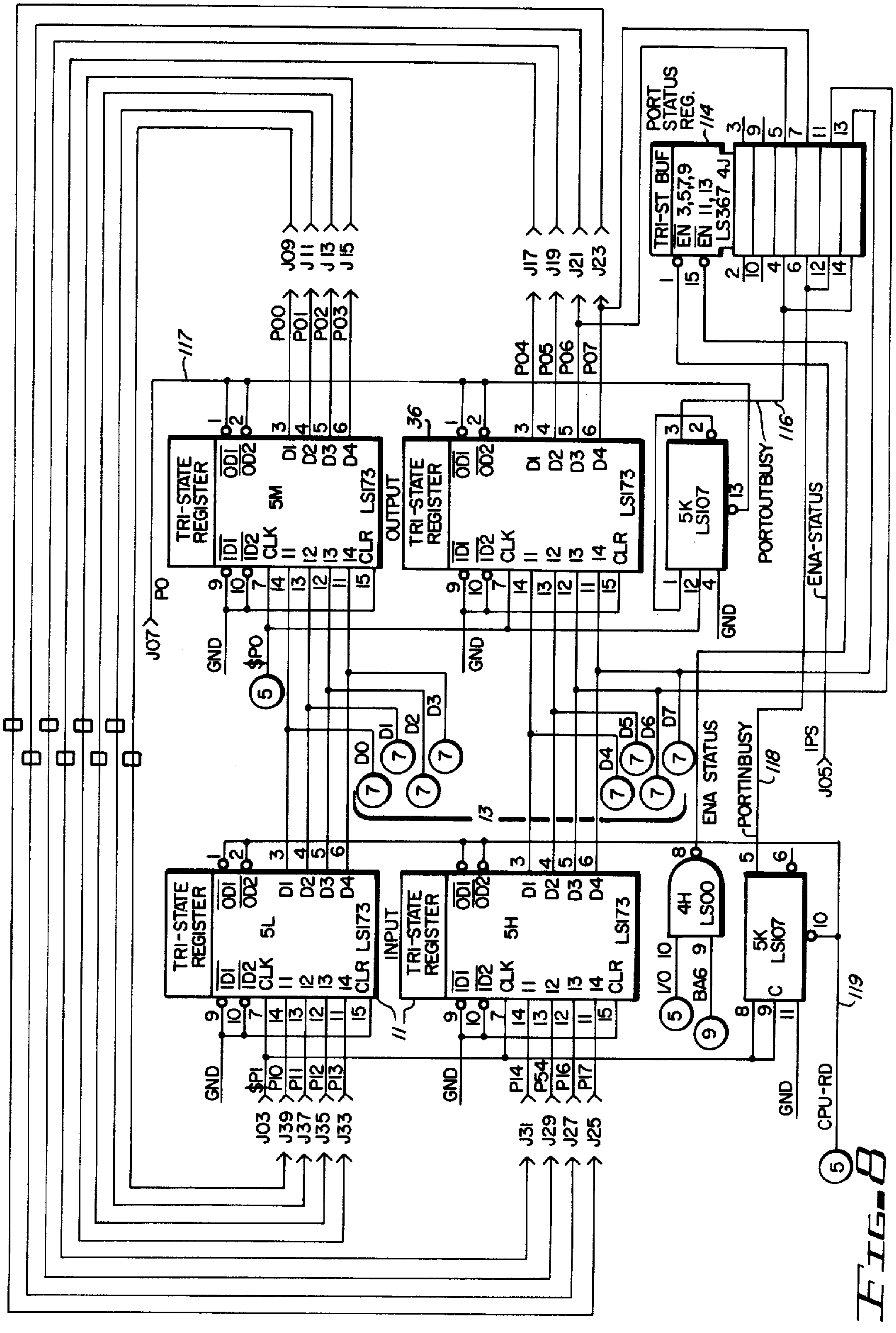
FIG. 8 is a logic diagram of the parallel port.

FIG. 8 shows the logic arrangement of the external parallel port 11. It consists of two eight bit tri-state registers, input register 11 for receiving and output register 36 for transmitting. When a character is transmitted, output register 36 is loaded and the Portoutbusy flag on line 116 is set. The device receiving the character must sense the Portoutbusy flag to determine when the character for transmission has been loaded from data bus 13. When output register 36 has been read, the Portoutbusy flag will be reset via line 117 to allow the terminal to load another character.

A similar situation exists for the input register 11. When a character is transmitted to the terminal, the Portinbusy flag on line 118 will be set when a character is loaded into the register. The software scans the Portinbusy flag and, when set, will read the contents of input register 11 resetting the Portinbusy flag via line 119. The external device must sense the status of the Portinbusy flag before attempting to reload the input register.

Figure 11:
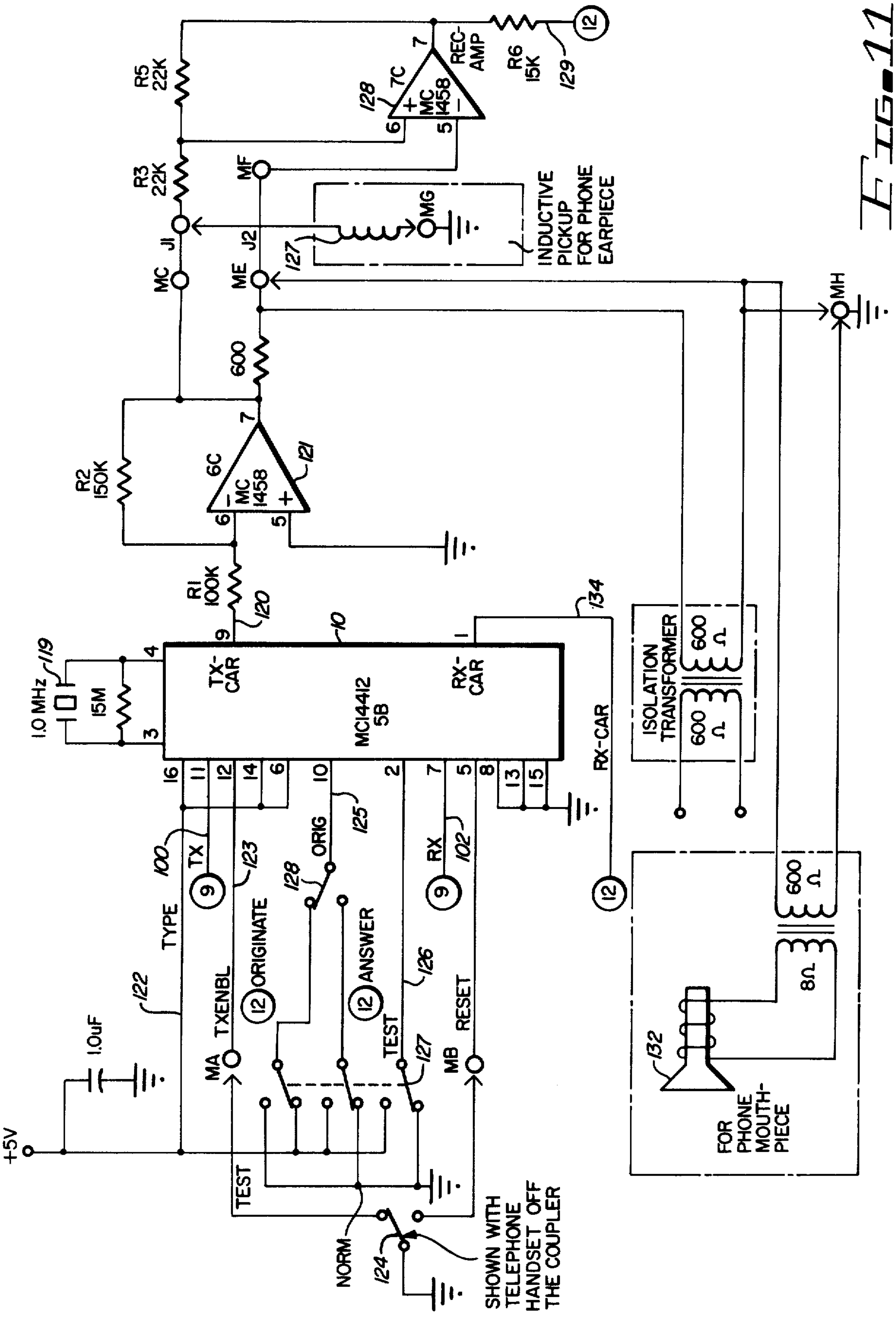
FIG. 11 is a logic diagram of the modem/telephone interface.

The modem 10 shown in FIG. 11 utilizes frequency shift keying modulation. Two frequencies are used to represent a logical zero (space) and a logical one (mark), the two frequencies being 200 hertz apart. Two pairs of frequencies are used for two way communications making the system of the full duplex variety. The lower pair of frequencies is used for transmission by the terminal while the higher pair is used for receiving in the originate mode. The modem may also be switched to the answer mode where the situation is reversed. During full duplex operation, both devices are transmitting at the same time.

When no data is being transmitted, modem 10 sends a continuous mark frequency or logical one. Character transmission commences with a start bit which is the first change from a high level to a low level. The marks and spaces making up the character to be transmitted follow this start bit. The character can, if desired, be followed by a parity bit and will be completed by transmission of a stop bit returning the communications line to the continuous mark state. This mark state will continue until the next character is sent.

Modem 10 is capable of speeds up to 600 baud and can be a Motorola MC 14412. The chip contains the complete frequency shift keying modulator and demodulator circuitry necessary for FSK modulation. A one mhz crystal 119 combines with an internal oscillator in this chip to provide a stable frequency reference. The oscillator output is divided down internally and passed through an internal seven stage frequency counter. The data to be transmitted enters modem 10 on the digital format TX signal line 100 from microprocessor 14 where it enters an internal modulator frequency decoder. It is modulated there using FSK techniques. The modulator frequency decoder is linked to a seven stage frequency counter and combines with said frequency counter and an internal digital sine wave generator to provide an FSK modulated digitally synthesized sine wave output on line 120 as the TX car signal. In the originate mode, this sine wave is 1270 Hz for a mark and 1070 Hertz for a space in U.S. Standard format while in the answer mode, a mark is 2225 Hz and a space is 2025 Hertz. This output signal is amplified in transmitter op amp 121 and fed to a speaker 132 for a telephone handset mouthpiece.

The Type signal on line 122 selects either U.S. or C.C.I.T.T. operational frequencies for both transmitting and receiving data. The TXENBL signal on line 123 enables the TX car output signal on line 120 when microswitch 124 sets the TXENBL signal at logical one. This microswitch is operated by the position of the telephone handset in the cradle.

The Orig signal on line 125 selects the pair of transmitting and receiving frequencies used during modulation and demodulation. When this signal is high, the U.S. originate mode or the C.C.I.T.T. channel No. 1 mode is selected. When the Orig signal is zero, the U.S. answer mode or the C.C.I.T.T. channel No. 2 mode is selected.

The test signal on line 126 will, when high, cause the self test mode to be entered where the demodulator is switched over to demodulating the transmitted signal from the modem itself. The self test and answer—originate mode selections are made by operation of switches 127 and 128.

Figure 12:
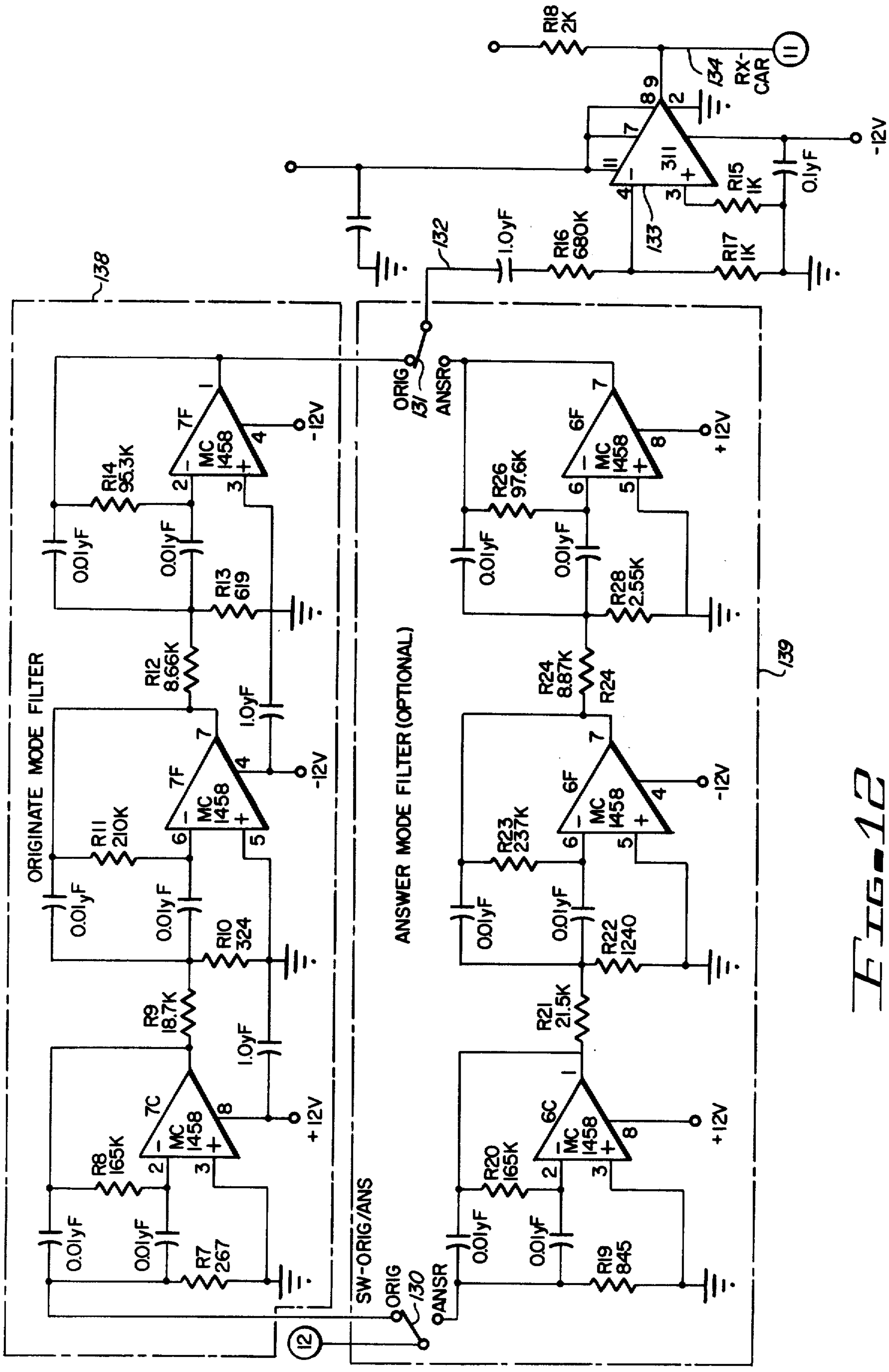
FIG. 12 is a circuit diagram of the modem filters.

The received signal from the telephone handset is picked up by inductive pickup 127 and amplified by receiver op amp 128. The output, Rec. Amp on line 129, is passed through either the three stage originate mode filter 138 or the three stage answer mode filter 139 of FIG. 12. Selection of the filter is made by switches 130 and 131. Each filter is comprised of three op amps tuned to form a very sharply defined bandpass filter which will amplify the received frequency pair and reject all other frequencies.

The output from these filters on line 132 is squared up and limited by signal limiter op amp 133 and applied as the RX car signal on line 134 to the demodulator of modem 10 in FIG. 11.

Modem 10 passes the square wave RX car signal through an internal level change detector and demodulator counter linked to the internal one mhz oscillator. The signal is then passed through an internal demodulator decoder for conversion to a digital signal for output as the RX signal on line 102 to microprocessor 14.

Table I pages 1-25 is a listing of the program stored in EROM 18 in the preferred embodiment. Other programs adapted more specifically to a particular user's needs may also be used.

Although the invention has been disclosed in terms of a preferred embodiment, other equivalent embodiments performing similar functions in a similar manner with similar means are intended to be included under the aegis of the concepts disclosed herein.

TABLE 1

```
PIP ASSEMBLER VERSION 4 LEVEL 1

LINE  ADDR  LABL  B1 B2 B3 B4 ERROR SOURCE

  1         0000                    R0      EQU     0
  2         0001                    R1      EQU     1
  3         0002                    R2      EQU     2
  4         0003                    R3      EQU     3
  5         0001                    R4      EQU     1
  6         0002                    R5      EQU     2
  7         0003                    R6      EQU     3
  8                                 *
  9         0080                    SENS    EQU     H'80'   PSU SENSE
 10         0040                    FLAG    EQU     H'40'   FLAG BIT
 11         0020                    II      EQU     H'20'   PSU - INTERRUPT INHIBIT
 12         0007                    SP      EQU     H'07'   PSU - STACK POINTER
 13                                 *
 14                                 *
 15         00C0                    CC      EQU     H'C0'   PSL - CONDITION CODE
 16         0020                    IDC     EQU     H'20'   PSL - INTERDIGIT CARRY
 17         0010                    RS      EQU     H'10'   PSL - REGISTER BANK SELECT
 18         0008                    WC      EQU     H'08'   PSL - 1 = WITH CARRY
 19         0002                    COM     EQU     H'02'   PSL - 1=LOG COMPARE, 0= ARIT COMP
 20         0001                    CARY    EQU     H'01'   PSL - CARRY BIT
 21                                 *
 22                                 * BRANCH CONDITIONING
 23         0000                    Z       EQU     0       ZERO
 24         0001                    P       EQU     1       POSITIVE
 25         0002                    N       EQU     2       NEGATIVE
 26         0000                    EQ      EQU     0       EQUAL
 27         0001                    LT      EQU     1       LESS THAN
 28         0002                    GT      EQU     2       GREATER THAN
 29         0003                    UN      EQU     3       UNCONDITIONAL
 30                                 *
 31                                 * INTERFACE BITS
 32                                 * REGISTER IS 08
 33                                 *
 34         0004                    EVOD    EQU     H'04'   EVEN ODD BIT
 35         0002                    BLNK    EQU     H'02'   BLANK BIT
 36         0001                    SYNC    EQU     H'01'   SYNC BIT
 37         0008                    OPTI    EQU     H'08'   OPTION BIT
 38         0010                    VECT    EQU     H'10'   VECTOR CONTROL
 39         0080                    WIND    EQU     H'80'   WINDOW
 40         0008                    CRLN    EQU     8       BITS PER CHAR
 41         0040                    PSRD    EQU     H'40'   PORT STATUS READ ADDRESS
 42         0080                    KEY     EQU     H'80'   KEYBOARD PORT ADDRESS
 43         0010                    PDAT    EQU     H'10'   PORT DATA REGISTER ADDRESS
 44         0040                    PWRT    EQU     H'40'   PORT WRITE REGISTER
 46                                 *
 47                                 *
 48                                 * INTERRUPTS
 49                                 * 0 LOC 0 INITIALIZE
 50                                 * 4 LOC 32 NORMAL INTERRUPT
```

```
                        * LOC 40 NORMAL OR OUTPUT
                        *
                        *
                                ORG       0
0000          76 60             PPSU      II+FLAG     INHIBIT INTERRUPTS
0002          77 12             PPSL      RS+COM      SET TO INDEX BANK 1
0004          05 01             LODI,R4   1           SET UP R4 FOR INCOMING DATA
0006          75 10             CPSL      RS          SET TO INDEX BANK 0
                        *
                        * CLEAR DATA AREA
                        *
0008          05 14             LODI,R1   LFLT        DEFAULTS, 1 INIT
000A          0D 41 9E          LODA,R0   DFLT,R1,-
000D          CD 68 02          STRA,R0   KEYT,R1
0010          59 78             BRNR,R1   $-6
                        *
0012          06 13             LODI,R2   LDAT        ZERO AREA
0014          20                EORZ      R0          LOAD 0 TO R0
0015          CE 48 16          STRA,R0   SDAT,R2,-
0018          5A 78             BRNR,R2   $-3
                        *
001A          3F 03 21          BSTA,3    SCS         CLEAR PAGE AND SET CURSOR
001D          1F 00 9D          BCTA,UN   BEGN
                        *
                        *
                        *
                                ORG       32
                        *
                        *NORMAL OR OUTPUT VECTOR
                        *
0020          77 12             PPSL      RS+COM      SET TO REGISTER BANK 1
0022          FB 11             BDRR,R6   RV2         R6 IS SET TO REMAINING COUNTS
0024          1B 19             BCTR,UN   INT         GO TO INTERUPT ROUTINE
0026          1B 0D             BCTR,UN   RV2         CONTINUE WITH R2
                        *
                        *
                        * NORMAL, INPUT, OR OUTPUT VECTOR
                        *
0028          77 12             PPSL      RS+COM      SELECT REGISTER BANK 1
002A          FB 02             BDRR,R6   RV12        R6 IS SET TO REMAINING COUNTS
002C          1B 11             BCTR,UN   INT         GO TO INTERUPT ROUTINE
                        *
002E    002E  F9 05     RV12    BDRR,R4   RV2         R1 IS SET TO REMAINING COUNTS
0030          3B 19             BSTR,UN   ISAV        SAVE PSL AND R0
0032          1F 88 09          BCTA,UN   *ISR1       GO TO INPUT SERVICE ROUTINE
                        *
0035    0035  FA 05     RV2     BDRR,R5   DONE        R5 IS SET TO REMAINING COUNT
0037          3B 12             BSTR,UN   ISAV        SAVE PSL AND R0
0039          1F 88 0B          BCTA,UN   *OSR1       GO TO OUTPUT SERVICE ROUTINE
                        *
        003C            DONE    RES       0
003C          75 10             CPSL      RS          RESET TO BANK 0
003E          37                RETE,UN
                        *
                        *
                        *
```

```
         003F               INT     RES       0
0003F          CC 08 10             STRA,R0   SAV0        SAVE R0
0042           13                   SPSL      0           SAVE PSL
0043           44 EF                ANDI,R0   H'EF'       DON'T SAVE BANK 1
0045           CC 08 14             STRA,R0   SVPL+1      THIS MODIFIES THE PPSL INSTRUCTION
0048           1F 88 0D             BCTA,UN   *DSR1       TO INTERUPT ROUTINES
                            *
                            *  THIS ROUTINE SAVES R0 AND PSL IN THE INTERRUPT RETURN ROUTINE
                            *
         004B               ISAV    RES       0
004B           CC 08 10             STRA,R0   SAV0        SAVE R0
004E           13                   SPSL      0           INDICATORS TO R0
004F           44 EF                ANDI,R0   H'EF'       REMOVE BANK 1
0051           CC 08 14             STRA,R0   SVPL+1      SAVE INDICATORS
0054           75 09                CPSL      WC+1        RESET WC AND CARRY
0056           17                   RETC,UN
                            *
                            *       THESE FOUR ROUTINES ARE THE SCREEN MANAGEMENT ROUTINES
                            *
         0057               IN96    RES       0           96 TH INTERRUPT SEND BLANK BIT
0057           07 0E                LODI,R6   14          SET DELAY UNTIL SYNC
0059           E6 64                COMI,R5   100         CHECK IF OUTPUT ROUTINE IS USED
005B           1A 02                BCTR,2    CPS         BRANCH IF YES
005D           06 FF                LODI,R5   255         INCREASE DELAY COUNTER
005F     005F  75 11        CPS     CPSL      RS+1        RESET TO BANK ZERO
0061           66 82                IORI,R2   BLNK+WIND    SET BLANKING BIT IN EOCY
0063           02                   LODZ      R2          COPY VECTOR TO R0
0064           44 04                ANDI,R0   EVOD        TEST FOR EVEN OR ODD
0066           84 6A                ADDI,R0   >I110       ADD >I110 FOR ENTRY POINT
0068           18 1A                BCTR,UN   RETW
                            *
         006A               I110    RES       0           110TH INTERRUPT
006A           04 02                LODI,R0   2           LOAD DELAY COUNT
006C           F8 7E                BDRR,R0   $           DELAY FOR VERTICAL SYNC
006E           07 03                LODI,R6   3           SET COUNT FOR RESET OF SYNC
0070           75 10                CPSL      RS          RETURN TO BANK 0
0072           66 01                IORI,R2   SYNC        ADD SYNC BIT
0074           04 7A                LODI,R0    >I113       GET NEXT ROUTINE ADDRESS
0076           D6 08                WRTE,R2   H'08'       WRITE TO CONTROL REGISTER
0078           18 0C                BCTR,UN   RETN
                            *
         007A               I113    RES       0           113TH INTERRUPT, RESET SYNC
007A           07 11                LODI,R6   17          SET DELAY FOR START OF DISPLAY
007C           75 10                CPSL      RS          RETURN    TO BANK 0
007E           46 7E                ANDI,R2   H'7E'        REMOVE SYNC BIT
0080           26 04                EORI,R2   EVOD        TOGGLE EVEN/ODD
0082           04 8C                LODI,R0   >I131       NEXT ROUTINE ADDRESS
0084     0084  D6 08        RETW    WRTE,R2   H'08'       WRITE TO CONTROL REGISTER
         0086               RETN    RES       0
0086           CC 08 0E             STRA,R0   ROUT        SAVE ADDRESS
0089           1F 08 0F             BCTA,UN   EXIT        RETURN TO USER
                            *
         008C               I131    RES       0 .         131 ST INTERRUPT END OF SCAN
008C           0F 08 16             LODA,R6   SCRL        GET STARTING ADDRESS FOR DISPLAY
008F           87 FE                ADDI,R6   -2
```

```
0091          07 10        WRTE,R6   H'10'    LOAD IT INTO HARDWARE START ADDRESS REG
0093          07 61        LODI,R6   97       REINITIALIZE INTERRUPT COUNT
0095          04 57        LODI,RO   >IN96    SET UP NEXT ROUTINE ADDRESS
0097          75 10        CPSL      RS       RETURN TO BANK 0
0099          46 FD        ANDI,R2   H'FD'     TURN BLANKING OFF
009B          1B 67        BCTR,UN   RETW     GO LOAD STATUS REG &  RO
                   *
                   *INITIALIZATION ROUTINE
       009D        BEGN    RES       0
009D          06 08        WRTE,R2   H'08'    INITIALIZE CONTROL REGISTER
009F          74 20        CPSU      II       ALLOW INTERUPTS
                   *
                   *INITIALIZATION COMPLETE
                   *
       00A1        MAIN    RES       0
00A1          F6 80        TMI,R2    WIND     CHECK FOR BLANKING TIME
00A3          18 03        BCTR,RO   TKEY     HALT IF DISPLAY TIME
00A5   00A5   40           HLT     HALT
00A6          1B 79        BCTR,UN   MAIN     LOOP BACK
                   *
                   *    TEST FOR KEYBOARD INPUT
                   *
       00A8        TKEY    RES       0
00A8          3F 01 B2     BSTA,UN   GETK     GO SCAN KEYBOARD
00AB          65 00        IORI,R1   0        SET CC TO STATUS OF KEYBOARD RETURN
00AD          18 07        BCTR,Z    TCOM     IF ZERO - NO BYTE SO CHECK SERIAL INPUT
00AF          1A 23        BCTR,N    BRK      IF MINUS - BREAK SO GO SEND BREAK
00B1          0F 08 07     LODA,R3   KBAT     LOAD KEYBOARD ATTACH BYTE
00B4          39 24        BSTR,P    DSPB     GO SEND DATA TO OUTPUT DEVICES
                   *
                   *    TEST FOR COMMUNICATIONS INPUT
                   *
       00B6        TCOM    RES       0        TEST FOR CIMM IN CHAR
00B6          0D 08 27     LODA,R1   CMCR     GET COMIN CHAR
00B9          18 0A        BCTR,Z    TPRT     BRANCH IF NO INPUT
00BB          20           EORZ      RO       0 TO RO
00BC          CC 08 27     STRA,RO   CMCR     RESET CIMM INPUT CHAR
00BF          01           LODZ      R1       MOVE CHARACTER TO RO
00C0          0F 08 06     LODA,R3   CIAT     LOAD COM IN ATTACH BYTE
00C3          39 15        BSTR,P    DSPB     GO SEND DATA TO ATTACHED DEVICES
                   *
                   *    TEST FOR PARALLEL PORT INPUT
                   *
       00C5        TPRT    EQU       $
00C5          54 40        REDE,RO   PSRD     GET STATUS OF INPUT PORT
00C7          F4 40        TMI,RO    H'40'    IS THERE ANY INPUT
00C9          98 56        BCFR,Z    MAIN     IF NOT LOOP BACK
00CB          54 10        REDE,RO   PDAT     READ DATA FROM PARALLEL PORT
00CD          0F 08 05     LODA,R3   PPAT     LOAD PARALLEL PORT ATTACHMENT
00D0          39 08        BSTR,P    DSPB     GO SEND IT TO OUTPUT DEVICES
00D2          1B 40        BCTR,UN   MAIN     LOOP BACK
                   *
                   *         SEND BREAK OUT COMM LINE
                   *
       00D4        BRK     RES       0        SEND BREAK OVER COMM LINE
```

```
0004          04 00                LODI,R0   0          ZERO OUT R0
0006          5B 19                BSTR,UN   CMOT       SEND SPACES FOR BREAK
0008          1B 60                BCTR,UN   IPRT       GO TEST PARALLEL PORT
                           *
                           *       THIS ROUTINE DISPATCHES THE BYTE IN R0 TO THE PROPER
                           *       OUTPUT ROUTINES SPECIFIED BY THE BYTE IN R3.
                           *
         00DA              DSPB    EQU       $
00DA          F7 04                TMI,R3    H'04'      IS PARALLEL PORT ATTACHED
00DC          98 02                BCFR,0    $+4        BRANCH IF NOT
00DE          D4 40                WRTE,R0   PWRT       WRITE BYTE TO PARALLEL PORT
00E0          CF 08 10             STRA,R3   DSCH       SAVE ROUTING BYTE
00E3          F7 02                TMI,R3    H'02'      IS COM LINE ATTACHED
00E5          3C 00 F1             BSTA,EQ   CMOT       IF IT IS SEND BYTE OUT ON IT
00E8          0F 08 10             LODA,R3   DSCH       RESTORE ROUTING BYTE
00EB          F7 01                TMI,R3    H'01'      IS SCREEN ATTACHED
00ED          3C 02 91             BSTA,EQ   PUTC       IF YES SEND BYTE TO SCREEN
00F0          17                   RETC,3               RETURN TO CALLER
                           *    THIS ROUTINE CALLED WHILE IN BANK ZERO
                           *     OUTPUTS A CHARACTER OVER THE COM LINE
         00F1              CMOT    RES       0
00F1          C3                   STRZ      R3         SAVE CHAR SET ZERO/NONZERO INDICATOR
                           *       BCTR,3    CMNP       ***NO PARITY IF ENABLED***
                           *
                           *    GENERATE PARITY BIT
                           *
00F2          75 01                CPSL      H'01'      CARRY = 0
00F4          05 00                LODI,R1   0
00F6          53                   RRR,R3    SHIFT      LOW ORDER BIT INTO CARRY
00F7          85 00                ADDI,R1   0          ADD TO COUNT OF BITS FROM CARRY
00F9          5B 78                BRNR,R3   $-3        GO BACK IF MORE BITS
00FB          45 01                ANDI,R1   H'01'      ISOLATE ALL BUT EVEN/ODD BIT
00FD          51                   RRR,R1    0          SHIFT INTO CARRY
00FE          51                   RRR,R1    0          SHIFT CARRY INTO MSB
00FF          61                   IORZ      R1         OCAR RESTORE CHAR WITH PARITY
0100     0100 CC 08 26     CMNP    STRA,R0   OCAR       SAVE CHAR TO OUTPUT
0103          05 09                LODI,R1   CRLN+1     INITIALIZE CHAR LENGTH
0105          CD 08 24             STRA,R1   OCNT
0108          76 20                PPSU      II         INHIBIT INTERUPTS
010A          77 10                PPSL      RS         SET BANK 1
010C          0E 08 04             LODA,R2   BAUD       SET BIT TIMING
010F          75 10                CPSL      RS         RETURN BANK 0
0111          74 60                CPSU      FLAG+II    ALLOW INTERUPTS AND SEND START
0113          05 73                LODI,R1   >COBT      GET ROUTINE POINTER
0115          CD 08 0C             STRA,R1   OCM1       STORE POINTER
0118          17                   RETC,UN
                           *
                           *             PROCESS CIMM IN DATA
                           *             DETERMINE IF ANY INPUT STARTED
                           *             IF NO RESCHEDULE SELF AFTER 1 INTERRUPT DELAY
                           *             IF YES RESCHEDULE FOR EACH BIT
                           *             CHAR IS SAVED IN LOC -CMCR-
                           *   INPUT START ROUTINE
                           *
         0119              CIMS    RES       0
```

```
0119         05 08                  LODI,R4   CRLN     BIT COUNT
011B         CD 08 23               STRA,R4   ICNT     CURRENT COUNT LEFT
011E         05 00                  LODI,R4   0
0120         CD 08 25               STRA,R4   ICAR     RESET INPUT CHAR BEING ASSEM
0123         05 37                  LODI,R4   >CIMH
0125         CD 08 0A               STRA,R4   ICM1
0128         0D 08 04               LODA,R4   BAUD     DELAY COUNT
012B         45 FE                  ANDI,R4   H'FE'    REMOVE LSB
012D         51                     RRR,R4    0        HALF BIT TIME
012E         75 11                  CPSL      RS+1
0130         66 10                  IORI,R2   VECT     SET VECTOR FOR INPUT
0132         B6 08                  WRTE,R2   H'08'    WRITE TO CONTROL REGISTER
0134         1F 08 0F               BCTA,UN   EXIT
                           *
                           *   HALF BIT ROUTINE
                           *   MIDDLE OF START BIT
                           *   IS IT REALLY START
                           *
       0137                CIMH     RES       0
0137         12                     SPSU
0138         1A 1A                  BCTR,N    COMI     BRANCH IF NOT
                           *YES IT IS
       013A                CIMN     RES       0
013A         05 45                  LODI,R4   >CIMB
013C         CD 08 0A               STRA,R4   ICM1
013F   013F  0D 08 04      CIMZ     LODA,R4   BAUD
0142         1F 08 0F               BCTA,UN   EXIT
                           *
                           *   FULL BIT TIME ROUTINE
                           *
       0145                CIMB     RES       0
0145         0D 08 23               LODA,R4   ICNT     CHAR LENGTH IN BITS
0148         18 0A                  BCTR,Z    COMI     IS THIS STOP BIT TIME?
014A         12                     SPSU
014B         44 80                  ANDI,R0   SENS     GET INPUT BIT
014D         6C 08 25               IORA,R0   ICAR
0150         F9 18                  BDRR,R4   CIMM
0152         1B 17                  BCTR,UN   CIMP     GO TO PARITY BIT ENTRY
                           *   GOT ENTIRE CHARACTER
       0154                COMI     RES       0
0154         0C 08 25               LODA,R0   ICAR     GET ASSEMBLED CHARACTER
0157         CC 08 27               STRA,R0   CMCR     SAVE INPUT CHAR
                           *
015A         05 19                  LODI,R4   >CIMS
015C         CD 08 0A               STRA,R4   ICM1     SAVE IN INTERRUPT POINTER
015F         05 01                  LODI,R4   1        REINITIALIZE R4
0161         75 10                  CPSL      RS       RESET TO BANK 0
0163         46 EF                  ANDI,R2   H'EF'    SET INTERUPT TO NORMAL
0165         B6 08                  WRTE,R2   H'08'    WRITE TO CONTROL REGISTER
0167         1F 08 0F               BCTA,UN   EXIT
                           *
                           *
       016A                CIMM     RES       0
016A         50                     RRR,R0
       016B                CIMP     RES       0        ENTER HERE FOR PARITY BIT
016B         CC 08 25               STRA,R0   ICAR     SAVE CURRENTLY ASSEM CHAR
```

```
016E          CD 08 23                  STRA,R4   ICNT      SAVE REMAIN BIT COUNT
0171          1B 4C                     BCTR,UN   CIM2      GET NEXT BIT
                               *
                               *          OUTPUT A CHAR OVER THE COM LINE
                               *   FLAG BIT =1 = MARK
                               *   FLAG BIT =0 = SPACE
                               *   FLAG BIT IS NORMALLY = 1
                               *   FIRST TRANSITION TO ZERO IS A SPACE
                               *   FOLLOWED BY FLAG = 1 WHEN DATA = 1
                               *   OR FLAG = 0 WHEN DATA = 0
                               *   ENDS WITH STOP BIT = FLAG = 1
                               *   CHARACTER IS 7  BITS + PARITY + 1 START BIT + 1 STOP BIT
                               * THESE ROUTINES ARE USED DURING INTERUPT VECTOR
       0173                    COBT     RES       0
0173          0E 08 26                  LODA,R5   OCAR      GET CHARACTER
0176          52                        RRR,R5    0         SHIFT RIGHT 1
0177          1A 04                     BCTR,N    COST      BIT SET
                               *
0179          74 40                     CPSU      FLAG      BIT NOT SET
017B          1B 02                     BCTR,UN   CONX      NEXT BIT
       017D                    COST     RES       0
017D          76 40                     PPSU      FLAG      SET BIT
       017F                    CONX     RES       0
017F          CE 08 26                  STRA,R5   OCAR      RESTORE CHARACTER
0182          0E 08 24                  LODA,R5   OCNT      GET ROUTINE COUNTER
0185          FA 07                     BDRR,R5   COMM      MORE
                               *
                               *   LAST BIT
0187          76 40                     PPSU      FLAG      SET STOP BIT
0189          06 97                     LODI,R5   >COLS     GET   POINTER FOR END ROUTINE
018B          CE 08 0C                  STRA,R5   OCM1      SAVE POINTER
018E   018E   CE 08 24         COMM     STRA,R5   OCNT      SAVE COUNTER
0191          0E 08 04                  LODA,R5   BAUD      GET RATE
0194          1F 0d 0F                  BCTA,UN   EXIT
       0197                    COLS     RES       0
0197          76 40                     PPSU      FLAG      OUTPUT STOP
0199          06 FF                     LODI,R5   H'FF'     DELAY AS LONG AS POSSIBLE
019B          1F 08 0F                  BCTA,UN   EXIT
                               *
                               *        THIS SECTION OF CONSTANTS AND CODE REPRESENTS A SET
                               *        OF DEFAULT VALUES AND MODIFIABLE CODE THAT IS MOVED
                               *        INTO RAM BY THE INITIALIZATION ROUTINE
                               *
       019E                    DFLT     EQU       $
                               *
                               *        DEFAULT OPERATING MODE
                               *
019E          4D                        DATA      A'M'      MULTICS (UPPER/LOWER)
019F          53                        DATA      A'S'      SCROLL MODE
01A0          19                        DATA      25        SPEED (300 BAUD)
                               *
                               *        DEFAULT ATTACHMENT TABLE
                               *
01A1          00                        DATA      H'00'     PARALLEL PORT UNATTACHED
01A2          01                        DATA      H'01'     COM IN ATTACHED TO SCREEN
```

```
389  01A3        03                    DATA      H'03'      KEYBOARD ATTACHED TO COM OUT, SCREEN
390  01A4        00                    DATA      0          DUMMY TO SAVE 3 BYTES
391                            *
392                            *       DEFAULT SERVICE ROUTINE ADDRESSES
393                            *
394  01A5        01 19                 ACON      CIMS       INPUT SERVICE ROUTINE POINTER
395  01A7        01 97                 ACON      COLS       OUTPUT SERVICE ROUTINE
396  01A9        00 57                 ACON      IN96       DISPLAY SERVICE ROUTINE ADDRESS
397                            *
398                            *       THE FOLLOWING CODE IS MOVED TO RAM AND IS USED AS
399                            *       THE EXIT ROUTINE FROM INTERRUPTS.  NOTE THAT THE
400                            *       CONSTANT FOR THE LODI BECOMES THE STORAGE LOCATION
401                            *       FOR RO AND THE CONSTANT IN THE PPSL BECOMES THE
402                            *       STORAGE LOCATION FOR THE PSL REGISTER.
403                            *
404  01AB        04 00                 LODI,RO   H'00'      RESTORE RO
405  01AD        75 FF                 CPSL      H'FF'      CLEAR PSL FIRST
406  01AF        77 00                 PPSL      H'00'      RESTORE PSL
407  01B1        37                    RETE,UN   RETURN     FROM INTERRUPT
408        01B2                EFLT    EQU       $
409        0014                LFLT    EQU       EFLT-DFLT  LENGTH OF DATA TO MOVE
411                            *
412                            *       THIS ROUTINE DEBOUNCES THE KEYBOARD
413                            *       RO = ?    R1 = -1  BRK
414                            *       RO = ?    R1 =  0  NOT DEBOUNCED
415                            *       RO = BYTE R1 =  1  VALID BYTE
416                            *       RO = BYTE R1 =  2  VALID BYTE & REP
417                            *
418        01B2                GETK    EQU       $
419  01B2        77 08                 PPSL      H'08'      WC = 1
420  01B4        38 35                 BSTR,3    RDK        READ KEYBOARD
421  01B6        59 04                 BRNR,R1   GK1
422  01B8        CB 08 18              STRA,R1   GKC        VALID TIME = 0
423  01BB        17                    RETC,3    RETURN
424  01BC  01BC  0F 08 18      GK1     LODA,R3   GKC        GET TIME KEY DOWN
425  01BF        E7 01                 COMI,R3   1          DEBOUNCED YET
426  01C1        18 0C                 BCTR,0    GKSC       BRANCH IF YES
427  01C3        E7 06                 COMI,R3   6          REPEAT TIME YET
428  01C5        98 06                 BCFR,0    GKNV       BRANCH IF NOT
429  01C7        07 03                 LODI,R3   3          SET TO SEND
430  01C9        F5 02                 TMI,R1    H'02'      RPT ON?
431  01CB        18 02                 BCTR,0    GKSC       BRANCH IF YES
432  01CD  01CD  05 00         GKNV    LODI,R1   0          SET NO CHAR
433  01CF  01CF  DB 00         GKSC    BIRR,R3   $+2        INC TIME
434  01D1        CF 08 18              STRA,R3   GKC        SAVE IT FOR NEXT TIME
435  01D4        65 00                 IORI,R1   0          SET INDICATORS
436  01D6        14                    RETC,0               RETURN IF NOT VALID
437  01D7        0F 08 1C              LODA,R3   ATSW       GET ATTACH SWITCH
438  01DA        98 06                 BCFR,Z    GK3        BRANCH IF SET
439  01DC        E4 11                 COMI,RO   H'11'      IS CURRENT BYTE DC1
440  01DE        98 0A                 BCFR,Z    GK4        GO TO RETURN IF NOT DC1
441  01E0        07 04                 LODI,R3   4          ELSE SET ATTACH SWITCH
442  01E2  01E2  CF 48 05      GK3     STRA,RO   PAT,R3,-   SAVE CURRENT BYTE
443  01E5        CF 08 1C              STRA,R3   ATSW       SAVE ATTACH SWITCH
444  01E8        05 00                 LODI,R1   0          INDICATE NO VALID CHARACTER
445  01EA  01EA  17            GK4     RETC,3               RETURN TO CALLER
```

```
                                *
                                *          THIS ROUTINE READS LINES 1 - 8 AND RETURNS
                                *           RO  R1
                                *          ---- -1     IF BRK
                                *          ----  0     IF TWO DATA KEYS DOWN
                                *          BYTE  1     VALID BYTE
                                *          BYTE  2     VALID BYTE & REP
                                *
01EB  01EB  54 86               RDK        REDE,RO    KEY+6      BRK,,,,,RPT,CTL,SHIFT
01ED        9A 03                          BCFR,2     RDK1       BRANCH IF BREAK OFF
01EF        05 FF                          LODI,R1    -1         SET BRK ON
01F1        17                             RETC,3     RETURN
01F2  01F2  C3                  RDK1       STRZ       R3         SAVE CTL, SHIFT
01F3        47 03                          ANDI,R3    H'03'      LEAVE ONLY CTL,SHIFT
01F5        CF 08 28                       STRA,R3    REGS       SAVE CTL, SHIFT FOR LATER
01F8        50                             RRR,RO     ISOLATE    RPT
01F9        50                             RRR,RO
01FA        D8 00                          BIRR,RO    $+2
01FC        44 03                          ANDI,RO    H'03'
01FE        CC 08 19                       STRA,RO    VC         VC = 1 OR 2
                                *NOW READ KEYBOARD
0201        20                             EORZ       RO         ZERO RO - (INPUT DATA)
0202        C3                             STRZ       R3         ZERO R3 - (ACTIVE LINES)
0203        75 01                          CPSL       CARY       CARRY = 0
0205        55 80                          REDE,R1    KEY+0      NUL TO BEL,@ TO G,' ' TO G
0207  0207  3F 02 80            KTSA       BSTA,3     KTST       CALL KTST
020A        55 81                          REDE,R1    KEY+1      BSP TO SI,H TO O,H TO O
020C        3B FA                          BSTR,3     *KTSA+1
020E        55 82                          REDE,R1    KEY+2      DLE TO ETB,P TO W,P TO W
0210        3B F6                          BSTR,3     *KTSA+1
0212        55 83                          REDE,R1    KEY+3      CAN TO US,X TO _,X TO DEL
0214        3B F2                          BSTR,3     *KTSA+1
0216        55 84                          REDE,R1    KEY+4      'B' TO ',0 TO 7
0218        3B EE                          BSTR,3     *KTSA+1
021A        55 85                          REDE,R1    KEY+5      ( TO /,8 TO ?
021C        3B EA                          BSTR,3     *KTSA+1
021E        55 87                          REDE,R1    KEY+7      CR,LF, ,,SR,SL,SU,SD
0220        3B E6                          BSTR,3     *KTSA+1
                                *NOW CONVERT INPUT - IF ANY
                                *CC REFLECTS RO STATUS BECAUSE OF KTST
0222        1C 02 77                       BCTA,0     NOVC       EXIT IF NOT
0225        3F 02 B7                       BSTA,3     U2B        CONVERT BITS 0,1,2
0228        5C 02 77                       BRNA,RO    NOVC       BRANCH IF TWO KEYS DOWN
022B        CD 08 1A                       STRA,R1    B012       SAVE BITS 0,1,2
022E        03                             LODZ       R3         GET LINE NO FOR CONVERT
022F        3F 02 B7                       BSTA,3     U2B        CONVERT LINE NO
0232        5C 02 77                       BRNA,RO    NOVC       BRANCH IF 2 ACTIVE LINES
0235        D1                             RRL,R1     SHIFT      LINE NO TO BITS 3,4,5
0236        D1                             RRL,R1
0237        D1                             RRL,R1
0238        45 38                          ANDI,R1    B'00111000'
023A        0C 03 1A                       LODA,RO    B012       CREATE BYTE LESS CTL/SHIFT
023D        E5 30                          COMI,R1    B'00110000'  LINE 8 INPUT?
023F        98 0A                          BCFR,EQ    RDK4       BRANCH IF NOT
0241        07 05                          LODI,R3    5          SET UP FOR PROPER 'SHIFT' BITS
0243        E4 07                          COMI,RO    7          WAS IT SPACE BAR
```

```
0245        98 18                 BCFR,EQ   RDK5       BRANCH IF NOT
0247        04 20                 LODI,R0   H'20'      SET UP SPACE
0249        1B 17                 BCTR,3    VRET       GO RETURN SPACE
024B  024B  0F 08 28      RDK4    LODA,R3   REGS       RESTORE CTL, SHIFT
024E        61                    IORZ      R1
024F        E4 1F                 COMI,R0   H'1F'      LINE 5 OR 6?
0251        99 0C                 BCFR,1    RDK5       BRANCH IF NO
0253        E4 2B                 COMI,R0   H'2B'
0255        99 02                 BCFR,LT   RD44
0257        64 10                 IORI,R0   H'10'
0259  0259  F7 01         RD44    TMI,R3    H'01'      IS SHIFT BIT ON
025B        18 05                 BCTR,0    VRET       RETURN IF NOT
025D        07 04                 LODI,R3   4          SET UP FOR UNSHIFT
025F  025F  2F 62 7A      RDK5    EORA,R0   CSTB,R3    OR IN PROPER CTL/SHFT BITS
0262  0262  0F 08 02      VRET    LODA,R3   KEYT
0265        E7 47                 COMI,R3   A'G'       UPPER CASE?
0267        98 0A                 BCFR,0    VRT1
0269        E4 61                 COMI,R0   H'61'      'A'
026B        1A 06                 BCTR,GT   VRT1
026D        E4 7A                 COMI,R0   H'7A'      'Z'
026F        19 02                 BCTR,LT   VRT1
0271        44 DF                 ANDI,R0   B'11011111'  SHIFT IT
0273  0273  0D 08 19      VRT1    LODA,R1   VC         SET BYTE VALID
0276        17                    RETC,3    RETURN     TO CALLER
0277  0277  05 00         NOVC    LODI,R1   0          SET NOT VALID
0279        17                    RETC,3    RETURN
027A  027A  60 40 00 00   CSTB    DATA      H'60,40,00,00,10,08'
            10 08
                          *
                          *       THIS ROUTINE OR'S INPUT IN R1 INTO R0
                          *       IF R1 IS NON-ZERO A 1 BIT IS SET IN
                          *       R3 TO INDICATE THE LINE.  SINCE EACH
                          *       CALL SHIFTS R3 RIGHT, AFTER SEVEN CALLS
                          *       R3 IS A UNARY NUMBER OF THE INPUT LINE
                          *
0280  0280  18 02         KTST    BCTR,EQ   $+4        BRANCH IF NO INPUT
0282        67 80                 IORI,R3   H'80'      INDICATE LINE ACTIVE
0284        53                    RRR,R3    SHIFT      R3 TO KEEP IN SYNC
0285        61                    IORZ      R1         OR INPUT INTO R0
0286        17                    RETC,3    RETURN
                          *
                          *       THIS ROUTINE CONVERTS THE UNARY NUMBER
                          *       IN R0 TO A BINARY NUMBER IN R1.  IF R0
                          *       CONTAINS TWO BITS THEN R0 IS RETURNED NON-ZERO
                          *
0287  0287  05 FF         U2B     LODI,R1   H'FF'      SET COUNT = -1
0289        75 01                 CPSL      CARY       SET CARRY = 0
028B  028B  D9 00         U2B1    BIRR,R1   $+2        ADD 1 TO COUNT (NO CARRY)
028D        50                    RRR,R0
028E        19 7B                 BCTR,1    U2B1       BRANCH IF PLUS
0290        17                    RETC,3    RETURN     IF ZERO(OK) OR -(2 BITS)
                          *
                          *THIS ROUTINE PUTS THE BYTE IN
                          *R0 INTO THE BUFFER
                          *
```

```
       0291                  PUTC    EQU       $
0291          44 7F                  ANDI,R0   H'7F'     CLEAR PARITY BIT
0293          3B 22                  BSTR,3    RVRS      TURN CURSOR OFF
0295          77 0A                  PPSL      WC+COM    WC,COM = 1
0297          0F 08 1B               LODA,R3   SPF       SPECIAL FLAG SET
029A          5F 03 3F               BRNA,R3   SSE       BRANCH IF YES
029D          E4 20                  COMI,R0   H'20'     IS IT CONTROL
029F          1A 1F                  BCTR,GT   PTSP      BRANCH IF YES
02A1          E4 7F                  COMI,R0   H'7F'     IS IT DEL
02A3          18 12                  BCTR,EQ   RVRS      DON'T DISPLAY IT IF YES
02A5          6C 08 1E               IORA,R0   DSPT      SET PROPER DISPLAY TYPE
02A8          CC 88 00               STRA,R0   *LNPT     PUT CHAR IN MEMORY
02AB          20                     EORZ      R0
02AC          05 01                  LODI,R1   1
02AE          3F 03 96               BSTA,3    INCP      LNPT = LNPT + 1
02B1          BC 03 16               BSFA,0    SHU       RESET LNPT IF OFF SCREEN
02B4          3F 03 B6               BSTA,3    CKSD      DO SCROLL THING
                             *WE NOW POINT TO NEXT POSITION
                             *SET CURSOR ON
02B7   02B7   0F 88 00       RVRS    LODA,R3   *LNPT     GET CURR CHAR
02BA          27 80                  EORI,R3   H'80'     SET REVERSE BIT
02BC          CF 88 00               STRA,R3   *LNPT     PUT IT BACK
02BF          17                     RETC,3    RETURN    TO CALLER
                             *
                             *WE HAVE A SPECIAL - CALC ITS ADDRESS
                             *IN THE TABLE AND GO TO THAT ROUTINE
       02C0                  PTSP    EQU       $
02C0          0C 63 76               LODA,R0   SPAT,R0   GET ADDRESS OFFSET FOR THIS CONTROL BYTE
02C3          C3                     STRZ      R3        SET UP FOR INDEXING
02C4          20                     EORZ      R0        ZERO R0 FOR ROUTINES
02C5          C1                     STRZ      R1        ZERO R1
02C6          BF 02 CB               BSXA      STCC,R3   CALL SPECIAL ROUTINE
02C9          1B 6C                  BCTR,3    RVRS      GO SET CURSOR AT CURRENT POINT
                             *
                             *       START OF SPECIAL BYTE ROUTINES
                             *
       02CB                  STCC    EQU       $
                             *
                             *       NON SPECIAL CONTROL BYTES
02CB   02CB   17             NSPC    RETC,UN             RETURN WITHOUT DOING ANYTHING
                             *
                             *CARRIAGE RETURN
02CC   02CC   0C 08 01       SCR     LODA,R0   LNPT+1    GET CURRENT POINTER
02CF          44 C0                  ANDI,R0   B'11000000'  ZERO BYTE POSITION
02D1          CC 08 01               STRA,R0   LNPT+1    RESTORE POINTER
02D4          17                     RETC,3
                             *
                             *MOVE CURSOR DOWN
                             *LINE FEED
       02D5                  SLF     EQU       $
02D5          05 40                  LODI,R1   64        SET UP CONSTANT OF 64 (1 LINE)
02D7          3F 03 96               BSTA,3    INCP      LNPT = LNPT + 64
02DA          18 05                  BCTR,EQ   SLFO      BRANCH IF ON SCREEN
02DC          04 10                  LODI,R0   <LN01     RESET TO LINE 1 (BYTE POSITION UNCHANGED)
02DE          CC 08 00               STRA,R0   LNPT
02E1   02E1   3F 03 B6       SLFO    BSTA,3    CKSD      DO SCROLL THING
```

```
02E4         17                    RETC,3
                            *
                            *MOVE CURSOR FORWARD
        02E5                SCF    EQU      $
02E5         05 01                 LODI,R1  1
02E7         3F 03 96              BSTA,3   INCP      LNPT = LNPT + 1
02EA         88 2A                 BSFR,0   SHU       RESET LNPT
02EC         17                    RETC,3
                            *
                            *MOVE CURSOR BACK
02ED    02ED 05 FF          SCB    LODI,R1  -1
                            *
                            *MOVE CURSOR UP
02EF    02EF 04 FF          SCU    LODI,R0  -1
02F1         65 C0                 IORI,R1  -64
02F3         3F 03 96              BSTA,3   INCP      LNPT = LNPT - 64
02F6         14                    RETC,0   RETURN    IF ON SCREEN
02F7    02F7 04 15          SCU1   LODI,R0  <LN24
02F9         6C 08 03              IORA,R0   MODE
02FC         44 17                 ANDI,R0   H'17'
02FE         CC 08 00              STRA,R0  LNPT
0301         17                    RETC,3
                            *
                            *ETB (CURSOR POSITIONING)
0302    0302 84 03          SETB   ADDI,R0  3         LET DC4 MAKE IT 6
                            *
                            *DC4 (SET OPTIONS)
0304    0304 84 03          SDC4   ADDI,R0  3
0306         CC 08 1B              STRA,R0  SPF
0309         17                    RETC,3
                            *
                            *DC2 (ENTER GRAPHICS MODE)
030A    030A 26 08          SDC2   EORI,R2  OPTI      TOGGLE GRAPHICS MODE
030C         17                    RETC,3
                            *
                            *DC3 (REVERSE DISPLAY TYPE)
030D    030D 0C 08 1E       SDC3   LODA,R0  DSPT      RETRIEVE DISPLAY TYPE
0310         24 80                 EORI,R0  H'80'     REVERSE IT
0312         CC 08 1E              STRA,R0  DSPT      STORE CHANGED TYPE
0315         17                    RETC,3
                            *
                            *HOME UP
0316    0316 05 10          SHU    LODI,R1  <LN01
0318         CD 08 00              STRA,R1  LNPT
031B         05 00                 LODI,R1  >LN01
031D         CD 08 01              STRA,R1  LNPT+1
                            *THE FOLLOWING OPTIONAL INSTRUCTIONS (21 BYTES) MAKE
                            *HOME UP (AND CURSOR POSITIONING) WORK PROPERLY
                            *IN SCROLL MODE
                            *      LODA,R1 SCRL     GET HARDWARE HOME POSITION
                            *      EORZ    R0
                            *      LODI,R3 3        SET UP TO MULTIPLY BY 8
                            *      RRL,R1           MULTIPLY BY 2
                            *      RRL,R0           (BOTH REGISTERS)
                            *      BDRR,R3 $-2      DO IT THREE TIMES
                            *      BSTA,3  INCP     ADD TO SOFTWARE HOME
```

```
                             *       RETC,0          RETURN IF ON SCREEN
                             *PAST END - THEREFORE SUUTRACT 24 LINES
       0320                  SHU1        EQU       $
                             *       LODI,R1  0
                             *       LODI,RU -6      24 LINES
                             *       BSTA,3  INCP    GO ADD -24
 0320              17                    RETC,3    RETURN
                             *
                             *CLEAR SCREEN
       0321                  SCS         EQU       $
 0321              77 0A                 PPSL      WC+COM     WC,COM = 1
 0323              75 01                 CPSL      CARY       CARRY = 0
                             *SET UP START ADDRESS
 0325              20                    EORZ      RO
 0326              CC 08 16              STRA,RU   SCRL       RESET HARDWARE LINE POINTER AS WELL
 0329              CC 06 01              STRA,RU   LNPT+1     SET BYTE POSITION TO 0
 032C              07 10                 LODI,R3   <LNO1      START AT LINE 1
 032E   032E       CF 08 00  SCS1        STRA,R3   LNPT       SET LINE NO IN POINTER
 0331              05 00                 LODI,R1   0          SET UP FOR 256 TIMES (4 LINES)
 0333              3F 03 E6              BSTA,3    CLCL       CLEAR 256 BYTES
 0336              D8 0U                 UIRR,R3   $+2        INCREMENT LINE BY 4
 0338              E7 18                 COMI,R3   H'18'      CHECK IF FINISHED
 033A              1A 72                 BCTR,GT   SCS1
 033C              3B 58                 BSTR,3    SHU        IF DONE RESET TO TOP OF SCREEN
 033E              17                    RETC,3    RETURN     TO CALLER
                             .
                             *ENTERED FOR CHAR AFTER
                             *ETB OR DC4
 033F   033F       E7 05     SSE         COMI,R3   5          IS SPECIAL FLAG 5 (Y POSITION)
 0341              18 09                 BCTR,EQ   SETY       BRANCH IF YES
 0343              1A 20                 BCTR,GT   DC4A       BRANCH IF 4,3,2,1 (DC4)
                             *            CURSOR POSITIONING ROUTINE
                             *
                             *            CTL W ENABLES THE CURSOR POSITIONING OPTION AND THE NEXT
                             *            TWO UYTES INPUT ARE USED AS THE CHARACTER POSITION (X)
                             *            AND THE LINE (Y).  THE X BYTE IS TAKEN MOD 64 SO 'A'
                             *            AN ASCII 'A' (101 OCTAL, 65 DECIMAL) WILL POINT TO CHARACTER
                             *            POSITION 1.  SIMILARLY THE Y BYTE (LINE NUMBER) IS USED
                             *            IN A MOD 32 FASHION SO AN ASCII 'A' GIVES LINE 1.
                             *            IT SHOULD BE NOTED THAT 'Z' AS A LINE NUMBER GIVES LINE 26
                             *            WHICH IS BEYOND LINE 24 AND LESS THAN LINE 32.  ANY DATA
                             *            POSITIONED ON LINES 25 THROUGH 31 WILL DISAPPEAR!
                             *
                             *           SAVE X CURSOR POSITION
 0345   0345       44 3F     SETX        ANDI,RO   B'00111111'  MOD(RO,64)
 0347              CC 08 17              STRA,RO   XPOS
 034A              FB 24                 BDRR,R3   DC4B
                             *SET CURSOR AT (X,Y)
        034C                 SETY        EQU       $
 034C              3F 03 16              BSTA,3    SHU        RESET POINTER
                             *TO SAVE SPACE TAKE MOD32 INSTEAD OF MOD24
 034F              44 1F                 ANDI,RO   B'00011111'  MOD(RO,32)
 0351              C1                    STRZ      R1
 0352              75 01                 CPSL      CARY       CARRY = 0
 0354              20                    EORZ      RO
 0355              CC 08 1B              STRA,RO   SPF        ZERO SPF WHILE WE HAVE IT
```

```
0358        07 06              LODI,R3   6          MULTIPLY BY 64
035A        D1                 RRL,R1
035B        D0                 RRL,R0
035C        F8 7C              BDRR,R3   $-2
035E        6D 08 17           IORA,R1   XPOS       ADD IN X POSITION
0361        3F 03 96           BSTA,3    INCP       GO ADD TO BASE
                      *THE FOLLOWING OPTIONAL INSTRUCTION WHEN USED WITH
                      *THE OPTIONAL CODE IN HOME UP MAKES THE CURSOR WORK
                      *PROPERLY IN SCROLL MODE
                      *     BCFA,EQ SHU1    IF OFF SCREEN, GO ADJUST
0364        17                 RETC,3    RETURN     TO CALLER
                      *
                      *        DC4 ENCOUNTERED
                      *          OPTIONS (IN ORDER OF ENTRY)
                      *
                      *        1.  K/2/CTL Y   SPEED      10/15/30 BAUD
                      *        2.  S/P         MODE       SCROLL OR PAGE
                      *        3.  M/G         KEYBOARD   MULTICS, OR GCOS (CAPS ONLY)
                      *
      0365            DC4A     EQU       $
0365        E7 03              COMI,R3   3          DON'T DISTURB BAUD RATE
0367        18 04              BCTR,EQ   $+6
0369        44 1F              ANDI,R0   B'00011111'  INSURE CAPS
036B        64 40              IORI,R0   B'01000000'
036D        CF 48 02           STRA,R0   KEYT,R3,-
0370  0370  CF 08 1B  DC4B     STRA,R3   SPF        SAVE COUNT FOR NEXT TIME
0373        1F 02 B7           BCTA,3    RVRS       SET CURSOR AND RETURN
                      *
                      *        THIS TABLE CONTAINS THE ADDRESSES
                      *        OF THE SPECIAL ROUTINES
      0376            SPAT     EQU       $          FUNCTION            KEY   HEX
0376        00                 DATA      NSPC-STCC  NUL                       [00]
0377        00                 DATA      NSPC-STCC  SOH                       [01]
0378        00                 DATA      NSPC-STCC  STX                       [02]
0379        00                 DATA      NSPC-STCC  ETX                       [03]
037A        00                 DATA      NSPC-STCC  EOT                       [04]
037B        00                 DATA      NSPC-STCC  ENQ                       [05]
037C        00                 DATA      NSPC-STCC  ACK                       [06]
037D        00                 DATA      NSPC-STCC  BEL                       [07]
037E        22                 DATA      SCB-STCC   CURSOR BACK         CTL H [08]
037F        1A                 DATA      SCF-STCC   CURSOR FORWARD      CTL I [09]
0380        0A                 DATA      SLF-STCC   LINE FEED           CTL J [0A]
0381        00                 DATA      NSPC-STCC  VT                        [0B]
0382        56                 DATA      SCS-STCC   CLEAR SCREEN        CTL L [0C]
0383        01                 DATA      SCR-STCC   CARRIAGE RETURN     CTL M [0D]
0384        00                 DATA      NSPC-STCC  SO                        [0E]
0385        00                 DATA      NSPC-STCC  SI                        [0F]
0386        00                 DATA      NSPC-STCC  DLE                       [10]
0387        00                 DATA      NSPC-STCC  DC1                       [11]
0388        3F                 DATA      SDC2-STCC  DC2 (GRAPHICS)      CTL R [12]
0389        42                 DATA      SDC3-STCC  (REVERSE)           CTL S [13]
038A        39                 DATA      SDC4-STCC  DC4 (SET OPTIONS)   CTL T [14]
038B        00                 DATA      NSPC-STCC  NAK                       [15]
038C        00                 DATA      NSPC-STCC  SYN                       [16]
038D        37                 DATA      SETB-STCC  ETB (CURSOR)        CTL W [17]
038E        00                 DATA      NSPC-STCC  CAN                       [18]
```

```
786  038F        00                   DATA     NSPC-STCC  EM                  [19]
787  0390        40                   DATA     SHU-STCC   HOME UP       CTL Z [1A]
788  0391        00                   DATA     NSPC-STCC  ESC                 [1B]
789  0392        24                   DATA     SCU-STCC   CURSOR UP     CTL / [1C]
790  0393        0A                   DATA     SLF-STCC   CURSOR DOWN   CTL ] [1D]
791  0394        00                   DATA     NSPC-STCC  RS                  [1E]
792  0395        00                   DATA     NSPC-STCC  US                  [1F]
794                              *
795                              *THIS ROUTINE ADDS R0 & R1 TO LNPT
796                              *AND ADJUSTS FOR END OF SCREEN
797                              *
798  0396  0396  75 01           INCP     CPSL     CARY       CARRY = 0
799  0398        8D 08 01                 ADDA,R1  LNPT+1
800  039B        8C 08 00                 ADDA,R0  LNPT
801  039E  039E  44 17           INCS     ANDI,R0  H'17'
802  03A0        CD 08 01                 STRA,R1  LNPT+1
803  03A3        CC 08 00                 STRA,R0  LNPT
804                              *NOW CHECK FOR OFF SCREEN
805  03A6        E4 10                    COMI,R0  <LN01      AFTER START?
806  03A8        16                       RETC,GT  RETURN     IF NOT
807  03A9        0F 08 03                 LODA,R3  MODE
808  03AC        E7 53                    COMI,R3  A'S'
809  03AE        18 03                    BCTR,EQ  CXS
810  03B0        E4 15                    COMI,R0  <LN25-1
811  03B2        15                       RETC,LT
812        03B3                  CXS      RES      0
813  03B3        75 C0                    CPSL     CC         SET CC = 0
814  03B5        17                       RETC,3   RETURN     WITH EQUAL
815                              *
816                              *        THIS ROUTINE CHECKS FOR SCROLL MODE AND
817                              *        EXITS IF NOT. IF SCROLL MODE THEN IT CHECKS THE POINTER
818                              *        AND CLEARS THE LINE (NEXT 64 CHARACTERS) IF WE ARE AT
819                              *        THE START OF A NEW LINE.
820                              *
821        03B6                  CKSD     EQU      $
822  03B6        0D 08 0′                 LODA,R1  LNPT+1
823  03B9        45 C0                    ANDI,R1  H'C0'      IGNORE BYTE POSITION
824  03BB        07 05                    LODI,R3  5          FIND LINE * 8
825  03BD        D1                       RRL,R1
826  03BE        D0                       RRL,R0
827  03BF        FB 7C                    BDRR,R3  $-2
828  03C1        77 01                    PPSL     H'01'      SET CARRY = 0
829  03C3        AC 08 16                 SUBA,R0  SCRL       IS IT = TO HDWR POINTER
830  03C6        E4 B9                    COMI,R0  185        23 LINES X 8
831  03C8        16                       RETC,GT
832  03C9        77 01                    PPSL     H'01'      SET CARRY = 1
833  03CB        A4 B8                    SUBI,R0  184        23 LINES X 8
834  03CD        75 01                    CPSL     H'01'      RESET CARRY
835  03CF        8C 08 16                 ADDA,R0  SCRL
836  03D2        CC 08 16                 STRA,R0  SCRL
837  03D5        0C 08 01                 LODA,R0  LNPT+1
838  03D8        C3                       STRZ     R3         SAVE BYTE POSITION TO RESTORE LATER
839  03D9        44 C0                    ANDI,R0  H'C0'      ZERO BYTE POSITION FOR CLEAR LINE
840  03DB        CC 08 01                 STRA,R0  LNPT+1
841  03DE        05 40                    LODI,R1  64         SET UP TO CLEAR CURRENT LINE
842  03E0        3B 04                    BSTR,3   CLCL       GO CLEAR CURRENT LINE
```

```
843  03E2        CF 08 01                  STRA,R3   LNPT+1    RESTORE BYTE POSITION
844  03E5        17                        RETC,3    RETURN    TO CALLER
845                             *THIS ROUTINE CLEARS THE CURRENT LINE
846  03E6  03E6  04 20          CLCL       LODI,R0   A' '
847  03E8        6C 08 1E                  IORA,R0   DSPT      SET PROPER DISPLAY TYPE
848  03EB        CD C8 00                  STRA,R0   *LNPT,R1,-
849  03EE        59 7B                     BRNR,R1   $-3       CONTINUE UNTIL ALL LINE DONE
850  03F0  03F0  17             CLEX       RETC,3    RETURN    TO CALLER
851        000F                 SLAK       EQU       1024-$
                                     ORG       4096
      1000                      LN01    RES       64
                                        RES       1344        21*64
      1580                      LN23    RES       64
      15C0                      LN24    RES       64
      1600                      LN25    EQU       $
                                *
                                *
                                        ORG       2048
      0800                      LNPT    RES       2           (ACON    LN01)
                                *
                                *THE NEXT 20 BYTES SHOULD REMAIN CONTIGUOUS
      0802                      KEYT    RES       1           KEYBOARD TYPE
      0803                      MODE    RES       1           SCROLL/PAGE
      0804                      BAUD    RES       1           100/150/300
                                *
      0805                      PAT     EQU       $           PERIPHERAL ATTACHMENT TABLE
      0805                      PPAT    RES       1           PARALLEL PORT ATTACHMENT
      0806                      CIAT    RES       1           COMMUNICATIONS IN ATTACHMENT
      0807                      KBAT    RES       1           KEYBOARD ATTACHMENT
                                        RES       1           DC1 STORAGE
                                *
      0809                      ISR1    RES       1           ADDRESS OF INPUT ROUTINE
      080A                      ICM1    RES       1           ADDRESS OF INPUT ROUTINE
      080B                      OSR1    RES       1           ADDRESS OF OUTPUT ROUTINE
      080C                      OCM1    RES       1           ADDRESS OF OUTPUT ROUTINE
      080D                      DSR1    RES       1           ADDRESS OF DISPLAY ROUTINE
      080E                      ROUT    RES       1           ADDRESS OF DISPLAY ROUTINE
      080F                      EXIT    RES       0
                                *
      0810                      SAVO    EQU       $+1
080F        04 00                       LODI,R0   H'00'       RESTORE R0
0811        75 FF                       CPSL      H'FF'
0813  0813  77 00               SVPL    PPSL      H'00'       RESTORE PSL
0815        37                          RETE,UN   RETURN      FROM INTERRUPT
                                *
      0816                      SDAT    EQU       $           START OF DATA AREA
0816  0816  00                  SCRL    DATA      0           SCROLL COUNTER
0817  0817  00                  XPOS    DATA      0
0818  0818  00                  GKC     DATA      0
0819  0819  00                  VC      DATA      0           VALID BYTE
081A  081A  00                  B012    DATA      0           BITS 0, 1, & 2
081B  081B  00                  SPF     DATA      0           SPECIAL FLAG
081C  081C  00                  ATSW    DATA      0           ATTACH SWITCH
081D  081D  00                  DSCH    DATA      0           ROUTING INFO FOR DISPATCHER
081E  081E  00                  DSPT    DATA      0           REVERSE CHARS
081F  081F  00                  DCMI    DATA      0           DELAY VALUE FOR COMIN
```

```
0820  0820  00              ICM2      DATA      0          FOR COMIN
                            *
0821  0821  00              DCMO      DATA      0          DELAY VALUE FOR COMOUT
0822  0822  00              OCM2      DATA      0          FOR COMOUT
                            *
      0823  0823  00              ICNT      DATA      0          COMIN-NUMBER UITS LEFT FOR BYTE
      0824  0824  00              OCNT      DATA      0          COMOUT-NUMBER OF BITS LEFT FOR BYTE
      0825  0825  00              ICAR      DATA      0          COMIN-CHAR BEING ASSEMBLED
      0826  0826  00              OCAR      DATA      0          COMOUT-BYTE BEING DISASSEMBLED
      0827  0827  00              CMCR      DATA      0          COMIN-LAST CHAR INPUT
      0828  0828  00              REGS      DATA      0          TEMPORARY HOLD FOR R3
            0829                  EDAT      EQU       $
            0013                  LDAT      EQU       EDAT-SDAT  LENGTH OF DATA AREA
                                  *
                                  *
                                  *
                                  *
                                  *
                                  *                  NUMBER OF INTERRUPTS PER BIT
                                  *                  300 BAUD REQ 25 INTERRUPTS
                                  *                  150 BAUD REQ 50 INTERRUPTS
                                  *                  110 BAUD REQ 75 INTERRUPTS
                                  *
                                  *
                                  *
                                            END

TOTAL ASSEMBLER ERRORS =    0
```

What is claimed is:

1. A computer terminal for displaying data and for communicating with another data processing device comprising:

(a) a television monitor for displaying data presented at an input as a composite video signal including video data, horizontal sync and blanking data and vertical sync and blanking data;

(b) first means having an output coupled to said input of said television monitor and having a character data input for receiving the data to be displayed and Hsync and Line Active signals for control of horizontal sync and blanking and Vert Sync and Blank signals for controlling vertical sync and blanking, said first means for converting the signals at said inputs into said composite video signal;

(c) second means for storing the data to be displayed, said second means having a data input for receiving the data to be displayed, having a character data output connected to said character data input of said first means for supplying the data to be displayed to said first means, having an address input for receiving the address in which to store data received at said data input in a write mode or for receiving the address to retrieve said data from for presentation at said data output in a read mode, and having a control input for receiving a $MEM signal for controlling whether said second means is in said read or write mode;

(d) third means having an output connected to said address input of said second means, having an address bus input and having a horizontal and vertical address input, said third means switching the address at said address bus input to said output for use by said second means when in the write mode, wherein said third means switches the address at said horizontal and vertical address input to said output for use by said second means when in the read mode, said switching controlled by an ISW signal control input;

(e) clock means for providing a timing waveform;

(f) fourth means for counting the periods of said timing waveform, said fourth means including apparatus for generating said horizontal and vertical address signals and sending them to said third means, wherein said fourth means also generates said Hsync and Line Active signals and sends said Hsync and Line Active signals to said first means, said fourth means generating an interrupt request signal after each N horizontal address signals have been counted, wherein N is a predetermined number;

(g) keyboard means having a plurality of switches, having a plurality of scan inputs and having a plurality of sense outputs, said keyboard means causing a distinct logical state on said sense outputs for each distinct combination of logical states of said scan inputs and switch activation of said keyboard means;

(h) parallel port means having an input register and having an output register for receiving data in said input register from said other data processing device, said parallel port means setting a Portinbusy memory bit to signal when data has been received, said parallel port means receiving data in said output register to be transmitted to said other data processing device, said data to be transmitted having a Portoutbusy memory bit;

(i) means for controlling the functioning of said computer terminal, said means for controlling having a data bus coupled to said data input of said second means, said means for controlling including apparatus for generating and sending said $MEM signal to said control input of said second means, whereby said $MEM signal causes switchover to said write mode when said means for controlling seeks to store data to be displayed in said second means, said means for controlling further including apparatus for receiving and counting the number of interrupt requests from said fourth means and for generating and sending said Vert Sync and Blank signals to said first means upon predetermined counts of said interrupt request, said means for controlling supplying the address and ISW control signal to the address bus input and ISW control signal input of said third means, whereby said third means switches said address to the address input of said second means when said second means is in said write mode in order to control the location of storage in said second means of data to be displayed, said means for controlling being selectively coupled to said sense output of said keyboard means via said data bus, wherein a portion of said address bus is coupled to said scan input in order to scan said keyboard means in order to determine which character and control keys are activated, said means for controlling encoding data on said scan inputs and said sense outputs into a code and processing character data thus derived in accord with the control characters received from said keyboard means, said means for controlling being coupled to said input and output registers of said parallel port means for loading data to be transmitted to said other data processing device into said output register when so desired by said operator, wherein said Portoutbusy memory bit is set to signal said other data processing device that data is available to be read, said means for controlling scanning said Portinbusy memory bit to sense when data has been loaded in said input register by said other data processing device for use by said computer terminal, whereby said data is read and processed according to the desires of the operator.

2. A low cost computer terminal apparatus for entering data and for transmitting data to and receiving data from another data processing device and for displaying data comprising:

(a) keyboard means comprised of a plurality of character and control switches arranged in matrix, said keyboard means having one side of the switches in each column coupled to a scan line and having a second side of the switches in each row coupled to a sense line, said keyboard means allowing an operator to send character data and control signals to said computer terminal by causing a binary data byte to appear on said sense lines for every distinct combination of character or control switch activation and binary data byte on said scan lines;

(b) modem means for coupling said computer terminal to said other data processing device over a long distance communication system, said modem means including apparatus for converting binary data from said computer terminal into signals suitable for transmission over said long distance communication system into binary data for use by said computer terminal, said modem means having a data input to receive data to be sent to said other data processing device and a data output for sending data to said computer terminal;

(c) parallel port means for coupling said computer terminal to another data processing device via a plurality of parallel lines, said parallel port means including apparatus for carrying data signals to and from said other data processing device, said parallel port means having an input register for receiving and holding data from said other data processing device, said input register including apparatus for setting a Portinbusy flag when said input register is loaded, said parallel port means including an output register for receiving and holding data from said computer terminal to be transmitted to said other data processing device, said output register including apparatus for setting a Portoutbusy flag when loaded;

(d) memory means for storing data to be displayed by said computer terminal; said memory means having a data input for receiving the data to be stored in the write mode and a character data output for presenting data retrieved from storage for display in a read mode, wherein said character data to said other data output is selectively coupled to said output register of said parallel port means for allowing simultaneous display and transmission of character data to said other data processing device, wherein said selective coupling occurs under control of a Memro control signal, said memory means having an address input for receiving the address to store said data in said write mode, said memory means receiving the address from which to retrieve said data in the read mode, said memory means having a control input for receiving a $MEM control signal causing said read mode or said write mode to be selected;

(e) switching means for switching the address at either of two inputs to an output coupled to said address input of said memory means, each of said two inputs receiving an address byte, said switching means having a control input for receiving an ISW control signal for causing switching of said inputs;

(f) clock means for providing a stable timing waveform;

(g) dividing counter means for counting the periods of said timing waveform and for generating an Advhosp signal after every Nth period of said timing waveform, wherein N is a predetermined number indicating one character display time has elapsed;

(h) a television monitor for displaying the video data contained in a composite video signal applied to an input to said television;

(i) a means for generating said composite video signal comprising;

(1) horizontal address counter means for counting the periods of said Advhosp signal, said horizontal address counter means generating an Hsync signal at the end of every line traced by said television monitor for synchronization of the horizontal sweep oscillator in said television monitor, said horizontal address counter means also generating a Line Active signal for blanking the television monitor display to the right and left of the lines of characters or graphics data being displayed, wherein said horizontal address counter means generates a binary representation of the count of said Advhosp signal periods as the horizontal address output representing the horizontal address of the data byte are being displayed, said horizontal address counter means being coupled to a portion of one of said inputs of said switching means for supplying the horizontal portion of the address of the character to be retrieved by said memory means in the read mode;

(2) vertical address counter for counting the occurrences of said Hsync signal, said vertical address counter generating a binary representation of the count as the vertical address output byte indicating the line said television monitor is displaying, wherein said vertical address counter generates an interrupt request signal after every Mth line, where M is a predetermined number, said vertical address output also being coupled to the remaining portion of the input of said switching means coupled to said horizontal address output;

(3) character generator means for storing a plurality of groups of binary bytes, each group of bytes representing a character which can be displayed by said computer terminal, each of said characters comprised of a dot matrix of light and dark dots with each group of binary bytes having one byte representing each row in said dot matrix, said character generator means having a character data input coupled to said character data output of said memory means for receiving character data of the character to be displayed to serve as the address for the particular matrix to be displayed one row at a time, said character generator means having an input for receiving a portion of the vertical address output byte, said portion serving to control which row of said matrix to display, said character generator means having a dot line output from which to send a dot line byte representing one row of the dot matrix being displayed;

(4) a character shift register having a parallel load input coupled to said dot line byte output and a video output, said character shift register also having a clock input coupled to said clock means, said character shift register receiving said dot line byte in parallel format and shifting it out from said video output in synchronization with said clock means in serial format as the video data component of said composite video signal;

(5) a video status register having a data bus input and Vert Sync and Blank outputs for receiving data indicating when a vertical synchronization pulse should occur in order to cause synchronization of the vertical sweep oscillator in said television set, said video status register also causing said Vert Sync output to assume a predetermined logical state upon the appearance of another predetermined logical state on said data bus, wherein said video status register receives data on said data bus indicating when vertical blanking of the display on the television set should occur and causes the Blank output to assume a predetermined logical state;

(6) gating means coupled to said video output of said character shift register and to said Vert Sync and Blank outputs of said video status register and to said Hsync and Line Active signals from said horizontal address counter means, said gating means combining all the above signals into a single composite video signal to be sent to said television set;

(j) digital processor means for controlling the input, output, and display functions of said computer terminal, said digital processor means having an address bus coupled to said scan lines of said keyboard means for periodically energizing each scan line, said digital processor means having a data bus selectively coupled to said sense lines for reading said data bytes, wherein said digital processor means encodes said data byte along with the information on said address bus into a distinctive character data code for each character and control character on said keyboard means, said digital processor means processing said data in accord with the entered commands of said operator, said data bus being coupled to said input and output registers and said Portinbusy and said Portoutbusy flags of said parallel port means, whereby said Portoutbusy flag is sensed by said digital processor means and said output register is loaded with data to be sent to said other data processing device, said digital processor means periodically testing the status of said Portinbusy flag and reading the data loaded into said input register by said other data processing device, wherein said digital processor means processes said data in accord with said entered commands, said digital processor means controlling when said character data output of said memory means is coupled to said output register by controlling said Memro signal, said digital processor means having a control output coupled to said modem means for supplying binary data to said modem means for transmission to said other data processing device, said digital processor means having a control input coupled to said modem means for sensing when data is being received by said modem, said digital processor means processing said data in accord with said entered commands, said processing under control of the operator by control characters entered from said keyboard means, wherein said processing includes the ability to take data from either the keyboard means, the modem means, or the parallel port means and send it to any combination of the television set, the parallel port means, and the modem means, said data bus coupled to said data input of said memory means for supplying the character data to be stored in said write mode, said address bus coupled to the other of said two inputs and to said switching means for supplying an address for storage of data in said write mode, wherein said digital processor means is responsive to said interrupt request from said vertical address counter for counting the number of interrupt requests and for setting and resetting said Vert Sync bit at two predetermined counts and said Blank bit at two predetermined counts via said data bus coupled to the input of said video status register, said digital processor means thereby controlling the display function.

* * * * *